US009650252B2

(12) United States Patent
Matsumoto

(10) Patent No.: US 9,650,252 B2
(45) Date of Patent: May 16, 2017

(54) PRETREATMENT METHOD AND CARBON NANOTUBE FORMATION METHOD

(75) Inventor: Takashi Matsumoto, Ibaraki (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 96 days.

(21) Appl. No.: 14/235,678

(22) PCT Filed: Jul. 9, 2012

(86) PCT No.: PCT/JP2012/067429
§ 371 (c)(1),
(2), (4) Date: Jan. 28, 2014

(87) PCT Pub. No.: WO2013/018509
PCT Pub. Date: Feb. 7, 2013

(65) Prior Publication Data
US 2014/0227454 A1 Aug. 14, 2014

(30) Foreign Application Priority Data

Jul. 29, 2011 (JP) .................................. 2011-167246

(51) Int. Cl.
C01B 31/02 (2006.01)
B01J 37/08 (2006.01)
(Continued)

(52) U.S. Cl.
CPC ........... *C01B 31/0233* (2013.01); *B01J 27/24* (2013.01); *B01J 35/002* (2013.01); *B01J 37/08* (2013.01);
(Continued)

(58) Field of Classification Search
CPC ...... C01B 31/00; C01B 2202/00; B01J 27/24; B01J 37/00; B82Y 30/00
(Continued)

(56) References Cited

U.S. PATENT DOCUMENTS 3,642,453 A * 2/1972 Chilton .................. B01D 51/10
204/164
6,998,103 B1 * 2/2006 Phillips .................. B82Y 30/00
423/447.3
(Continued)

FOREIGN PATENT DOCUMENTS

CN 101952036 A 1/2011
JP 2007-252970 A * 3/2006 ............. B01J 37/00
(Continued)

OTHER PUBLICATIONS

"Effects of oxygen and nitrogen on carbon nanotube growth using a microwave plasma chemical vapor deposition technique" D.J. Yang*, Q. Zhang, S.F. Yoon, J. Ahn, S.G. Wang, Q. Zhou, Q. Wang, J.Q. Li, Surface and Coatings Technology 167 (2003) 288-291.*

*Primary Examiner* — David Turocy
*Assistant Examiner* — Mohammad Mayy
(74) *Attorney, Agent, or Firm* — Nath, Goldberg & Meyer; Jerald L. Meyer

(57) ABSTRACT

The pretreatment method for carbon nanotube formation according to the present invention comprises a first plasma treatment process in which catalytic metal fine particles are formed by applying plasma to a catalytic metal layer and atomizing the catalytic metal, and a second plasma treatment process in which the catalytic metal fine particles are activated by applying plasma of a gas mixture, in which a hydrogen-containing gas and a nitrogen gas are mixed, to the catalytic metal fine particles. A co-catalyst layer formed of nitride such as TiN and TaN is preferably disposed below the catalytic metal layer. The co-catalyst layer is nitrated by the plasma of the gas mixture including the hydrogen-containing gas and the nitrogen gas and the activation ratio of the catalytic metal fine particles is increased.

23 Claims, 20 Drawing Sheets

(51) Int. Cl.
*B82Y 40/00* (2011.01)
*B82Y 30/00* (2011.01)
*B01J 37/34* (2006.01)
*B01J 27/24* (2006.01)
*B01J 35/00* (2006.01)

(52) U.S. Cl.
CPC ............. *B01J 37/349* (2013.01); *B82Y 30/00* (2013.01); *B82Y 40/00* (2013.01); *C01B 2202/22* (2013.01)

(58) Field of Classification Search
USPC ........................................................ 427/553
See application file for complete search history.

(56) References Cited

U.S. PATENT DOCUMENTS

| | | | |
|---|---|---|---|
| 2005/0042373 A1* | 2/2005 | Kraus | C23C 16/45542 427/248.1 |
| 2005/0046322 A1* | 3/2005 | Kim | B82Y 10/00 313/309 |
| 2007/0237704 A1* | 10/2007 | Dijon et al. | 423/445 B |
| 2010/0209704 A1* | 8/2010 | Yamazaki et al. | 428/368 |

FOREIGN PATENT DOCUMENTS

| | | | | |
|---|---|---|---|---|
| JP | 2007-252970 A | | 10/2007 | |
| JP | 2007-261867 A | * | 10/2007 | ............. C01B 31/02 |
| JP | 2011-068513 A | | 4/2011 | |
| KR | 10-0966353 B1 | | 6/2010 | |

\* cited by examiner

PRETREATMENT METHOD AND CARBON NANOTUBE FORMATION METHOD

TECHNICAL FIELD

The present invention relates to a pretreatment method for forming a carbon nanotube and a carbon nanotube formation method.

BACKGROUND

Carbon nanotubes allow ballistic conduction in which electrons are transported without being scattered, and show excellent electrical conductivity (low electrical resistance) and high current density tolerance (high electromigration tolerance). Therefore, carbon nanotubes are expected as wiring material for the next-generation of semiconductor devices to replace Cu wiring that is currently used in the mainstream.

A known carbon nanotube growth technique is a plasma CVD method of exciting and decomposing hydrocarbon molecules or the like as raw material using high-energy plasma and growing a carbon nanotube by reacting active species with a catalytic metal. An example of a carbon nanotube film forming method using the plasma CVD method is disclosed in Patent Document 1 (Japanese Patent Laid-open Publication No. 2007-252970) which suggests a method of forming a catalytic layer made of a transition metal such as Ni, Fe, and Co on a substrate and forming a carbon nanotube film thereon by a plasma CVD method using a carbon-containing gas and a hydrogen gas at a treatment temperature of 600 degrees C. The method of Patent Document 1 includes activating the surface of a catalytic metal by supplying radicals in the plasma using the carbon-containing gas and the hydrogen gas to the surface of the catalytic metal, thereby preventing a reduction in catalytic activity of the catalytic metal due to oxidation of the surface thereof when the catalytic metal is converted into fine particles. However, since the method of Patent Document 1 requires heating up to approximately 600 degrees C., even in the plasma CVD method, the substrate itself and a material film formed on the substrate must have a heat resistance corresponding to the heating temperature. Therefore, it is difficult to apply the method of Patent Document 1 to, for example, a plastic substrate or the like.

There is also a known thermal CVD method of thermally decomposing hydrocarbon molecules of raw material on the catalytic metal surface to grow a carbon nanotube. As a carbon nanotube film forming method using the thermal CVD method, for example, Patent Document 2 (Japanese Patent Laid-open Publication No. 2007-261867) suggests a method of forming a carbon nanotube film on a substrate, on which a fine particle catalyst is formed, by a thermal CVD method using a hydrocarbon gas as a raw material at a temperature of 800 to 1000 degrees C. The method of Patent Document 2 includes: a fractional process of converting a catalytic metal thin film such as a Fe thin film formed on a substrate into a granular catalyst by heating the thin film to 800 to 1000 degrees C. in an oxygen atmosphere (for example, in an atmospheric atmosphere) to melt the thin film and then cooling the thin film; and a re-fractional process of converting the granular catalyst into fine particles by heating the granular catalyst to 800 to 1000 degrees C. in the oxygen atmosphere (for example, in an atmospheric atmosphere). However, in the method of Patent Document 2, since the substrate supporting the catalytic metal is heated to a high temperature of 800 degrees C. or more, which may cause diffusion of impurities in the substrate, the substrate requires a large thermal budget. Therefore, it is difficult to apply the method of Patent Document 2 to a semiconductor device manufacturing process.

In addition, Patent Document 3 (Japanese Patent Laid-open Publication No. 2011-68513) suggests a method of performing an oxygen plasma treatment on a metal catalytic layer, activating the surface of the metal catalytic layer by performing a hydrogen-containing plasma treatment, and then forming a carbon nanotube film on the activated metal catalytic layer using a plasma CVD method.

In order to use a carbon nanotube as wiring material of semiconductor devices or the like, the carbon nanotube is required to have i) high density, ii) high vertical orientation, and iii) high quality. Improvement of crystalline orientation by raising the carbon nanotube growth temperature is effective to achieve "iii) high quality", and "ii) high vertical orientation" can be effectively achieved by raising the carbon nanotube density so that thin carbon nanotubes can be mutually supported. That is to say, "i) high density" is important to achieve "ii) high vertical orientation" and "iii) high quality".

However, even if catalytic metal fine particles serving as nucleus of carbon nanotube formation are disposed at high density on the substrate, when the activation ratio of the catalyst is small, the carbon nanotube cannot be formed at high density. The suggestion of Patent Document 3 is excellent in that the activation ratio of the catalytic metal fine particles is increased by performing the hydrogen plasma treatment after the oxygen plasma treatment. However, it is believed that, if the activation ratio of the catalytic metal fine particles is further improved, the carbon nanotube can be formed at a higher density while high vertical orientation can be also achieved.

SUMMARY

The present invention provides some embodiments of a method for efficiently activating catalytic metal fine particles so as to form a carbon nanotube having high density and high vertical orientation.

According to one embodiment of the present invention, a pretreatment method is performed prior to a carbon nanotube growth using a CVD method on catalytic metal fine particles formed on a treatment target. The pretreatment method includes preparing the treatment target having a catalytic metal layer formed on a surface of the treatment target, performing a first plasma treatment to form the catalytic metal fine particles by applying a plasma to the catalytic metal layer to atomize a catalytic metal, and performing a second plasma treatment to activate the catalytic metal fine particles by applying a plasma of a gas mixture containing a hydrogen-containing gas and a nitrogen gas to the catalytic metal fine particles.

In a pretreatment method of the present invention, the treatment target may include a co-catalytic layer formed of a nitride below the catalytic metal layer. The co-catalytic layer may be formed of a nitride selected from a group consisting of TiN, TaN, SiN and AlN.

In a pretreatment method of the present invention, a treatment temperature of the first plasma treatment may be $T_1$ and a treatment temperature of the second plasma treatment may be $T_2$, the temperature $T_2$ being higher than the temperature $T_1$. The temperature $T_1$ may be in a range of 100 degrees C. or more and 450 degrees C. or less, and the temperature $T_2$ may be in a range of 100 degrees C. or more and 550 degrees C. or less. A temperature difference $(T_2-T_1)$ between the temperature $T_2$ and the temperature $T_1$ may be 50 degrees C. or more. A heating section having a heating rate of at least 100 degrees C./min or more may be included in the course of a temperature change from the temperature $T_1$ to the temperature $T_2$.

A carbon nanotube formation method of the present invention includes performing a pretreatment according to any one of the aforementioned pretreatment methods, and growing a carbon nanotube on an activated catalytic metal fine particles using a CVD method.

In the carbon nanotube formation method of the present invention, the second plasma treatment and growing a carbon nanotube may be performed consecutively in the same treatment chamber.

In the carbon nanotube formation method of the present invention, growing a carbon nanotube may be performed using a thermal CVD method. A treatment temperature of the thermal CVD method may be in a range of 300 degrees C. or more and 550 degrees C. or less.

In the carbon nanotube formation method of the present invention, growing a carbon nanotube may be performed using a plasma CVD method. A treatment temperature of the plasma CVD method may be in a range of 100 degrees C. or more and 550 degrees C. or less.

DETAILED DESCRIPTION

Embodiments of the present invention will now be described in detail with reference to the accompanying drawings.

<Treatment Apparatus>

Figure 1:
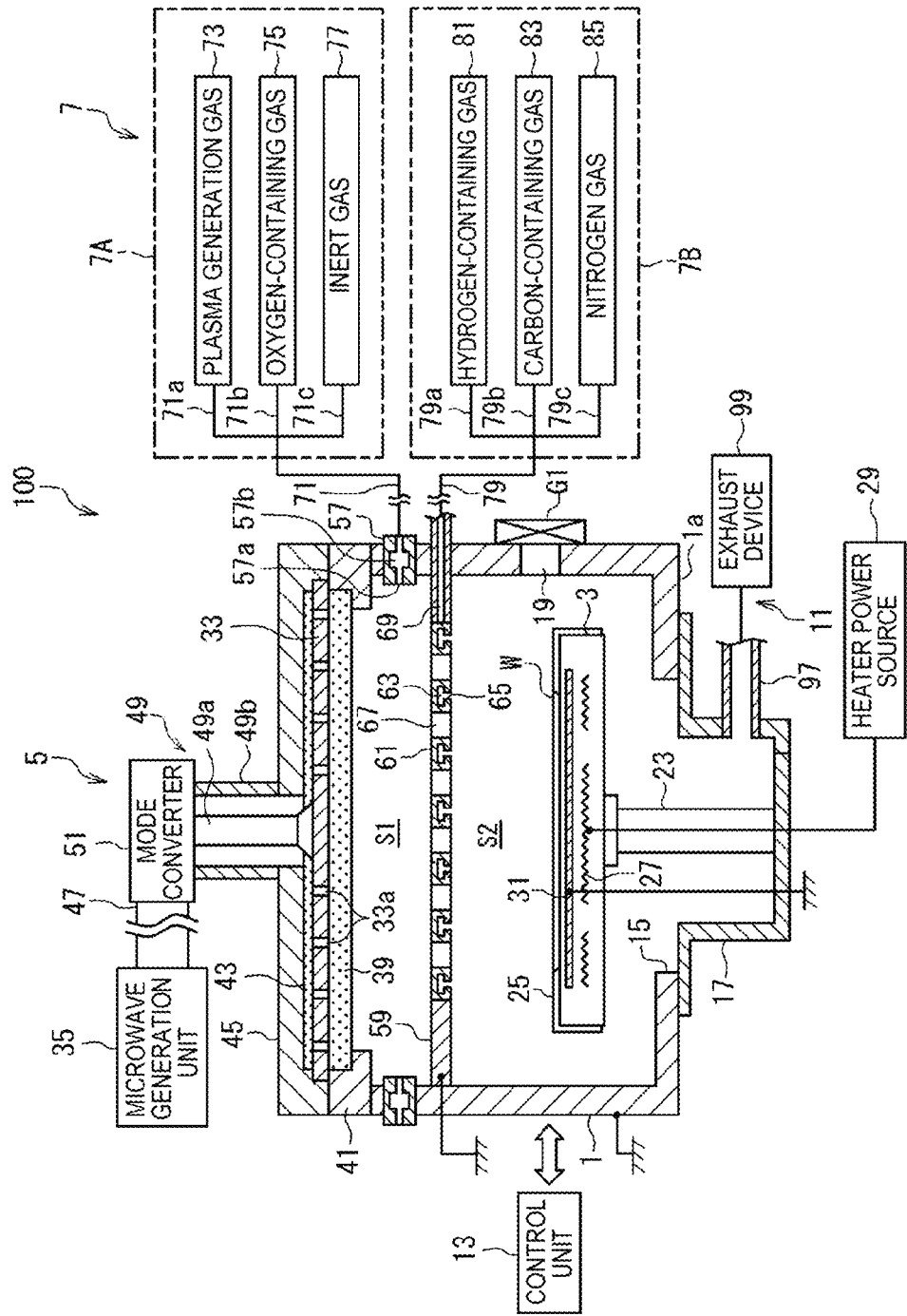
FIG. 1 is a schematic cross-sectional view of an example configuration of a treatment apparatus for use in a pretreatment method and a carbon nanotube formation method according to an embodiment of the present invention.

First, an outline of a treatment apparatus for use in a pretreatment method and a carbon nanotube formation method according to an embodiment of the present invention will be described. FIG. 1 is a schematic cross-sectional view of an example of a treatment apparatus. A treatment apparatus 100 illustrated in FIG. 1 is configured as a microwave plasma treatment apparatus of an RLSA (Radial Line Slot Antenna) type that is capable of forming a uniform microwave plasma in a treatment container by radiating a microwave from a plurality of microwave radiation holes of a planar antenna. A microwave plasma is suitable for an atomization treatment and an activation treatment as pretreatments of a carbon nanotube formation, because it is a low electron temperature plasma mainly composed of radicals. The treatment apparatus 100 may be also used as a thermal CVD apparatus configured to form a carbon nanotube by a thermal CVD method or a plasma CVD apparatus configured to form a carbon nanotube by a plasma CVD method.

Main components of the treatment apparatus 100 include a substantially cylindrical treatment container 1, a stage 3 provided in the treatment container 1 and configured to mount a semiconductor wafer (hereinafter, simply referred to as "wafer") W as a treatment target, a microwave introduction unit 5 configured to introduce a microwave into the treatment container 1, a gas supply unit 7 configured to supply gases into the treatment container 1, a gas exhaust unit 11 configured to exhaust the interior of the treatment container 1, and a control unit 13 configured to control respective components of the treatment apparatus 100.

<Treatment Container>

A circular opening 15 is formed at a substantially central portion of a bottom wall 1a of the treatment container 1, and an exhaust chamber 17 communicating with the opening 15 and projecting downward is provided in the bottom wall 1a. In addition, a transfer port 19 via which the wafer W is loaded into and unloaded from the treatment container 1 and a gate valve G1 configured to open and close the transfer port 19 are provided in the side wall of the treatment container 1.

<Stage>

The stage 3 is made of, for example, ceramics such as AlN. The stage 3 is supported by a cylindrical support member 23, which is made of ceramics and extends upward from the bottom center of the exhaust chamber 17. A guide ring 25 for guiding the wafer W is provided on the outer periphery of the stage 3. In addition, lift pins (not illustrated) for raising and lowering the wafer W are provided inside the stage 3 so as to be projectable and retractable with respect to the upper surface of the stage 3.

A resistance heating type heater 27 is embedded in the stage 3. The wafer W mounted on the stage 3 is heated through the stage 3 by supplying electric power to the heater 27 from a heater power supply 29. A thermocouple (not illustrated) is provided in the stage 3 to control the heating temperature of the wafer W in a range of 50 to 650 degrees C. Unless otherwise specified, a temperature of the wafer W means a temperature measured by the thermocouple rather than a set temperature of the heater 27. An electrode 31 having approximately the same size as the wafer W is embedded above the heater 27 in the stage 3. The electrode 31 is electrically grounded.

<Microwave Introduction Unit>

The microwave introduction unit 5 includes a planar antenna 33 disposed on the upper portion of the treatment container 1 and having a plurality of microwave radiation holes 33a, a microwave generation unit 35 configured to generate a microwave, a transmission plate 39 made of a dielectric, a frame-shaped member 41 provided on the upper portion of the treatment container 1, a slow-wave plate 43 made of a dielectric and configured to control the wavelength of the microwave, and a cover member 45 configured to cover the planar antenna 33 and the slow-wave plate 43. The microwave introduction unit 5 further includes a waveguide 47 and a coaxial waveguide 49 configured to guide the microwave generated in the microwave generation unit 35 to the planar antenna 33, and a mode converter 51 provided between the waveguide 47 and the coaxial waveguide 49.

The transmission plate 39 transmitting the microwave therethrough is made of a dielectric, for example, quartz or ceramics such as AlN and $Al_2O_3$. The transmission plate 39 is supported by the frame-shaped member 41. The gap between the transmission plate 39 and the frame-shaped member 41 is airtightly sealed by a seal member such as an O-ring (not illustrated). Thus, the interior of the treatment container 1 is kept airtight.

The planar antenna 33 has, for example, a disc shape and is made of an electrically conductive member such as an aluminum plate, a nickel plate or a copper plate having a surface plated with gold or silver, or an alloy thereof. The planar antenna 33 is disposed above the transmission plate 39 (outside the treatment container 1) and arranged substantially parallel to the upper surface (a mounting surface for the wafer W) of the stage 3. The planar antenna 33 is engagedly supported by the upper end of the frame-shaped member 41. The planar antenna 33 includes the plurality of rectangular (slot-like) microwave radiation holes 33a configured to radiate a microwave therethrough. The microwave radiation holes 33a are formed through the planar antenna 33 in a predetermined pattern. Typically, a pair of the microwave radiation holes 33a adjacent to each other is arranged to form a predetermined shape (for example, a T shape), and plural pairs of the microwave radiation holes 33a are arranged in a concentric shape, a spiral shape, a radial shape or the like as a whole. The length and the arrangement interval of the microwave radiation holes 33a are determined based on a wavelength ($\lambda g$) of a microwave.

The slow-wave plate 43 having a higher dielectric constant than a vacuum is provided on the upper surface of the planar antenna 33. Since a wavelength of a microwave is lengthened in a vacuum, the slow-wave plate 43 functions to adjust a plasma by shortening the wavelength of the microwave. For example, quartz, a polytetrafluoroethylene resin, a polyimide resin or the like may be used as a material of the slow-wave plate 43.

The cover member 45 is arranged to cover the planar antenna 33 and the slow-wave plate 43. For example, the cover member 45 is formed of metal such as aluminum or stainless steel. An end of the coaxial waveguide 49 is connected to the center of the upper wall (a ceiling portion) of the cover member 45. The coaxial waveguide 49 has an inner conductor 49a extending upward from the center of the planar antenna 33, and an outer conductor 49b arranged to surround the inner conductor 49a. The mode converter 51 is provided at the other end of the coaxial waveguide 49 and connected to the microwave generation unit 35 via the waveguide 47. The waveguide 47 is a rectangular waveguide extending in the horizontal direction, and the mode converter 51 functions to convert the mode of a microwave propagating in the waveguide 47 from a TE mode to a TEM mode. The microwave introduction unit 5 configured as described above allows a microwave generated in the microwave generation unit 35 to be transmitted to the planar antenna 33 through the coaxial waveguide 49 and to be introduced into the treatment container 1 through the transmission plate 39. A microwave having a frequency of, for example, 2.45 GHz may be used. Alternatively, a microwave of 8.35 GHz, 1.98 GHz or the like may be used in some embodiments. Hereinafter, unless otherwise stated, a microwave having a frequency of 2.45 GHz is used.

<Gas Supply Unit>

The gas supply unit 7 includes a shower ring 57 as a first gas introduction unit, having a ring shape and provided along the inner wall of the treatment container 1, and a shower plate 59 as a second gas introduction unit, provided below the shower ring 57 and vertically partitioning the inner space of the treatment container 1.

The shower ring 57 has a plurality of gas discharge holes 57a via which gases are introduced into the inner space of the treatment container 1, and a gas flow passage 57b communicating with the gas discharge holes 57a. The gas flow passage 57b is connected to a first gas supply unit 7A via a gas supply pipe 71. The first gas supply unit 7A includes three branch pipes 71a, 71b, and 71c branched from the gas supply pipe 71. The branch pipes 71a, 71b, and 71c are provided with flow controllers and valves (not illustrated).

The branch pipe 71a is connected to a plasma generation gas supply source 73 that supplies a plasma generation gas. As the plasma generation gas, for example, a rare gas or the like may be used. As the rare gas, Ar, Ne, Kr, Xe, He or the like may be used, for example, and in some embodiments Ar is used because Ar can stably generate a plasma.

The branch pipe 71b is connected to an oxygen-containing gas supply source 75 that supplies an oxygen-containing gas for use in an atomization treatment as a first plasma treatment or a cleaning treatment of the treatment container 1. As the oxygen-containing gas for use in the atomization treatment, $O_2$, $H_2O$, $O_3$, $N_2O$ or the like may be used, for example. Alternatively, in the atomization treatment, a plasma may be generated by using rare gas only (without using the oxygen-containing gas).

The branch pipe 71c is connected to an inert gas supply source 77 that supplies an inert gas. As the inert gas, $N_2$ or the like may be used, for example. The inert gas supplied from the inert gas supply source 77 may be used as, for example, a purge gas, a pressure-control gas or the like.

The shower plate 59 includes a gas distribution member 61 made of, for example, aluminum and having a grid pattern when viewed from above. The gas distribution member 61 has a gas flow passage 63 formed in the grid pattern thereof, and a plurality of gas discharge holes 65 formed in the gas flow passage 63 and opened to face the stage 3. The grid-like gas distribution member 61 further has a plurality of through-holes 67. The gas flow passage 63 of the shower plate 59 is connected to a gas supply passage 69 that reaches the wall of the treatment container 1, and the gas supply passage 69 is connected to a second gas supply unit 7B through a gas supply pipe 79. The second gas supply unit 7B has three branch pipes 79a, 79b, and 79c branched from the gas supply pipe 79. The branch pipes 79a, 79b, 79c are provided with flow controllers and valves (not illustrated).

The branch pipe 79a is connected to a hydrogen-containing gas supply source 81 that supplies a hydrogen-containing gas for use in activation treatment and carbon nanotube formation. As the hydrogen-containing gas, $H_2$, $NH_3$ or the like maybe used, for example.

The branch pipe 79b is connected to a carbon-containing gas supply source 83 that supplies a carbon-containing gas as raw material of the carbon nanotube. As the carbon-containing gas, ethylene ($C_2H_4$), methane ($CH_4$), ethane ($C_2H_6$), propane ($C_3H_8$), propylene ($C_3H_6$), acetylene ($C_2H_2$), methanol ($CH_3OH$), ethanol ($C_2H_5OH$) or the like may be used, for example.

The branch pipe 79c is connected to a $N_2$ gas supply source 85 that supplies a $N_2$ gas. The $N_2$ gas supplied from the $N_2$ gas supply source 85 is mixed with the hydrogen-containing gas in the activation treatment, and may be also used as a purge gas, a carrier gas or the like, for example.

<Gas Exhaust Unit>

The gas exhaust unit 11 includes the exhaust chamber 17, an exhaust pipe 97 provided in the side surface of the exhaust chamber 17, and an exhaust device 99 connected to the exhaust pipe 97. Although not illustrated, the exhaust device 99 includes, for example, a vacuum pump, a pressure-control valve and the like.

<Plasma Generation Space and Mixing/Diffusion Space>

The treatment apparatus 100 is configured to introduce the plasma generation gas from the shower ring 57 into a space 51 within the treatment container 1. The space 51 is disposed between the shower plate 59 and the transmission plate 39 for introducing the microwave therethrough. The space 51 is a plasma generation space where a plasma is mainly generated.

The inner space of the treatment container 1 further includes a space S2 disposed between the shower plate 59 and the stage 3. The space S2 is a mixing/diffusion space where the carbon-containing gas introduced via the shower plate 59 and the plasma generated in the space S1 are mixed and active species in the plasma are diffused toward the wafer W mounted on the stage 3.

<Control Unit>

Figure 2:
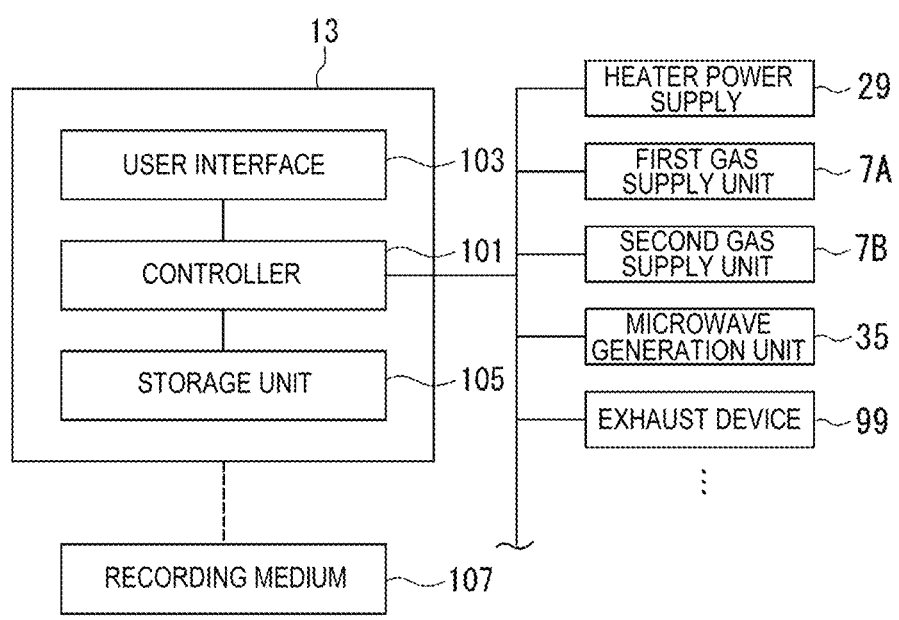
FIG. 2 is a view of an example configuration of a control unit of the treatment apparatus of FIG. 1.

The control unit 13 is a module controller that controls respective components of the treatment apparatus 100. The control unit 13 is typically a computer, and, for example, as illustrated in FIG. 2, includes a controller 101 having a CPU and a user interface 103 and a storage unit 105 connected to the controller 101. The controller 101 is a control means that controls respective components of the treatment apparatus 100 (for example, the heater power supply 29, the first gas supply unit 7A, the second gas supply unit 7B, the microwave generation unit 35, the exhaust device 99 or the like) associated with treatment conditions such as temperatures, pressures, gas flow rates, microwave outputs and the like, for example.

The user interface 103 includes a key board or a touch panel via which a process manager inputs commands for managing the treatment apparatus 100, and a display that visualizes and displays operational status of the treatment apparatus 100. The storage unit 105 stores therein recipes where control programs (software) to be executed in the treatment apparatus 100 under the control of the controller 101 to perform various types of treatment and treatment condition data are recorded. If necessary, by calling a certain recipe from the storage unit 105 in response to instructions from the user interface 103 and allowing the controller 101 to execute the recipe, a desired treatment is performed in the treatment container 1 of the treatment apparatus 100 under the control of the controller 101. The recipes of the control programs and the treatment condition data may be stored in a computer-readable recording medium 107. As the recording medium 107, a CD-ROM, a hard disk, a flexible disk, a flash memory or the like may be used, for example. The recipes may be stored in other devices and transmitted to the control unit 13 via, for example, a dedicated line.

<Treatment System>

Figure 3:
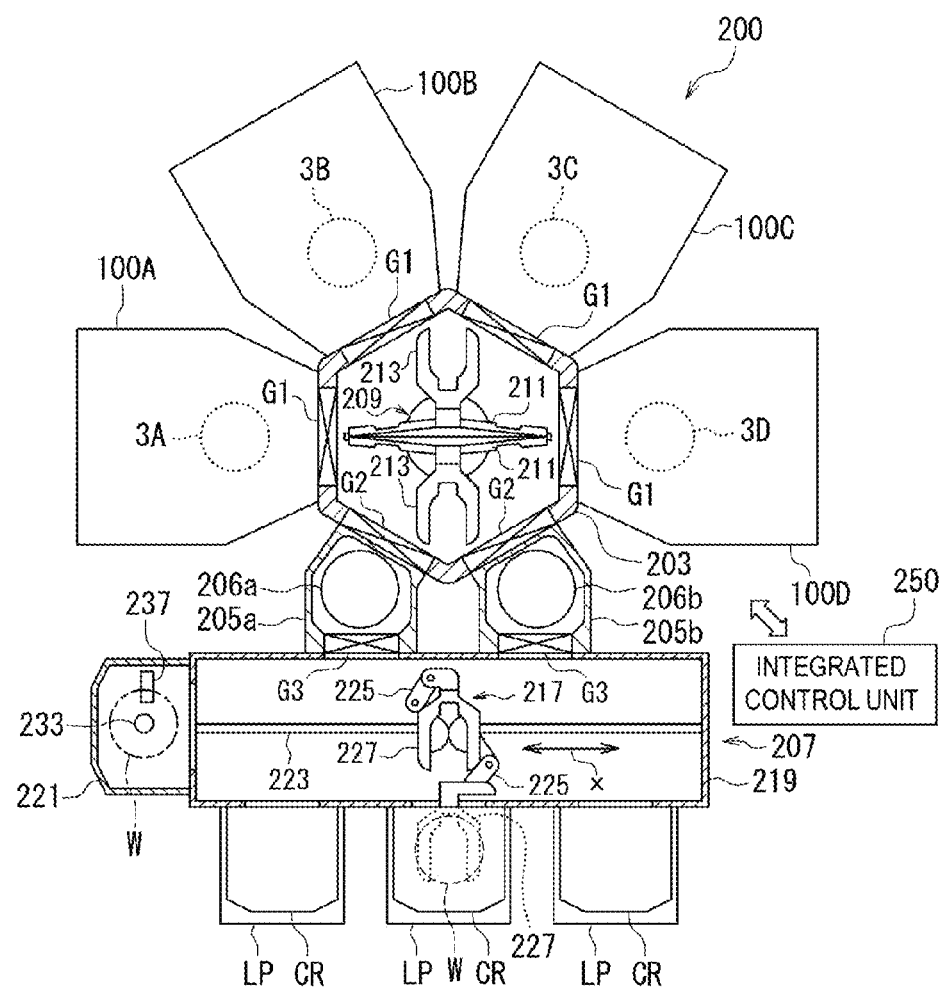
FIG. 3 is a view of an example configuration of a multi-chamber type treatment system provided with the treatment apparatus of FIG. 2.

Next, an example configuration of a treatment system for use in the pretreatment method and the carbon nanotube formation method according to the present embodiment will be described with reference to FIG. 3. A treatment system 200 illustrated in FIG. 3 is configured as a cluster tool having a multi-chamber structure provided with a plurality of process modules (four process modules in FIG. 3) 100A, 100B, 100C, and 100D.

As a main configuration, the treatment system 200 includes four process modules 100A, 100B, 100C, and 100D, a vacuum side transfer chamber 203 connected to the process modules 100A to 100D via gate valves G1, two load-lock chambers 205a and 205b connected to the vacuum side transfer chamber 203 via gate valves G2, and a loader unit 207 connected to the load-lock chambers 205a and 205b via gate valves G3.

<Process Module>

Each of the four process modules 100A to 100D has the same construction as the treatment apparatus 100 of FIG. 1, and may be configured to perform the atomization treatment, the activation treatment, and the carbon nanotube formation process on the wafer W. Alternatively, the process modules 100A to 100D may be configured to perform different types of treatment on the wafer W. Stages 3A, 3B, 3C, and 3D, each mounting the wafer W, are disposed in the process modules 100A to 100D, respectively.

<Vacuum Side Transfer Chamber>

The vacuum side transfer chamber 203 configured to be vacuum-evacuable is provided with a transfer device 209 serving as a first substrate transfer device that transfers the wafer W with respect to the process modules 100A to 100D and the load-lock chambers 205a and 205b. The transfer device 209 includes a pair of transfer arm units 211 disposed to face each other. The respective transfer arm units 211 are configured to be extensible and rotatable around the same rotation axis. At the leading end of each of the transfer arm units 211, a fork 213 for holding the wafer W is provided. The transfer device 209 transfers the wafer W between the process modules 100A to 100D or between the process modules 100A to 100D and the load-lock chambers 205a and 205b in a state where the wafer W is mounted on the fork 213.

<Load-Lock Chamber>

Stages 206a and 206b configured to mount the wafer W are provided in the load-lock chambers 205a and 205b, respectively. The load-lock chambers 205a and 205b are configured to be switched between a vacuum state and an atmospheric state. The wafer W is transferred between the vacuum side transfer chamber 203 and an atmospheric side transfer chamber 219 (described below) via the stages 206a and 206b of the load-lock chambers 205a and 205b.

<Loader Unit>

The loader unit 207 includes the atmospheric side transfer chamber 219 provided with a transfer device 217 as a second substrate transfer device that transfers the wafer W, three load ports LP disposed to be adjacent to the atmospheric side transfer chamber 219, and an orienter 221 as a position measurement device that is disposed to be adjacent to another side of the atmospheric side transfer chamber 219 to measure the position of the wafer W. The orienter 221 includes a rotation plate 233 rotating by a drive motor (not illustrated), and an optical sensor 237 that is provided at the outer periphery of the rotation plate 233 to detect the peripheral portion of the wafer W.

<Atmospheric Side Transfer Chamber>

The atmospheric side transfer chamber 219 has, for example, a rectangular shape when viewed from above and is provided with circulation equipment which circulates nitrogen gas, clean air or the like (not illustrated). A guide rail 223 is provided in the atmospheric side transfer chamber 219 along the longitudinal direction thereof. The transfer device 217 is slidably supported by the guide rail 223. That is to say, the transfer device 217 is configured to be movable in the X direction along the guide rail 223 by a driving mechanism (not illustrated). The transfer device 217 has a pair of transfer arm units 225 arranged vertically in two stages. Each of the transfer arm units 225 is configured to be extensible and rotatable. At the leading end of each of the transfer arm units 225, a fork 227 is provided as a holding member that mounts and holds the wafer W. The transfer device 217 transfers the wafer W among wafer cassettes CR in the load ports LP, the load-lock chambers 205a and 205b, and the orienter 221 in a state where the wafer W is mounted on the fork 227.

<Load Port>

The load ports LP are configured to mount the wafer cassettes CR. Each of the wafer cassettes CR is configured to mount and accommodate a plurality of wafers W equi-spacedly in multi-levels.

<Integrated Control Unit>

Respective components of the treatment system 200 are connected to and controlled by an integrated control unit 250. In addition to controlling the load-lock chambers 205a, 205b, the transfer devices 209 and 217 and the like, the integrated control unit 250 integratedly controls the control units 13 that individually control the process modules 100A to 100D.

<Pretreatment and Carbon Nanotube Formation>

Figure 4:
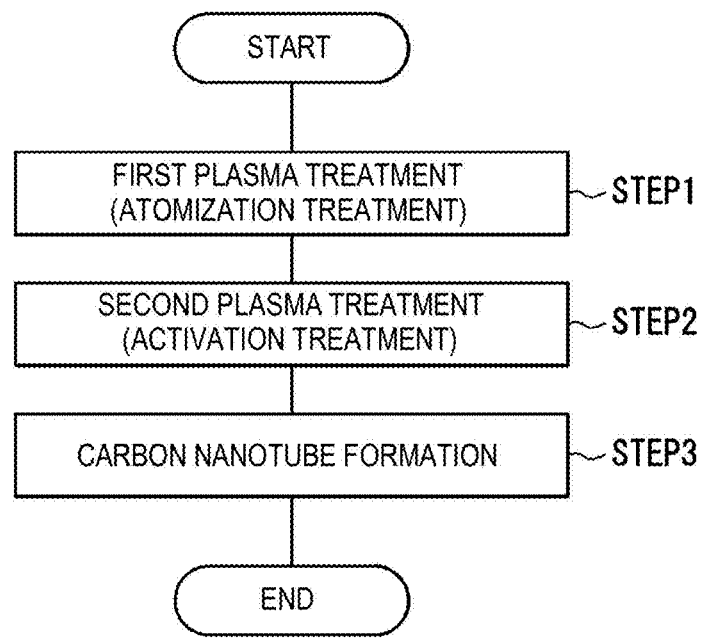
FIG. 4 is a flowchart of a carbon nanotube formation method according to an embodiment of the present invention.

Next, a pretreatment method and a carbon nanotube formation method performed in the treatment apparatus 100 will be described. FIG. 4 is a flowchart of the pretreatment method and the carbon nanotube formation method according to an embodiment of the present invention. FIGS. 5A to 5D are longitudinal cross-sectional views of the vicinity of the surface of the wafer W for illustrating main processes of the carbon nanotube formation method. The carbon nanotube formation method according to the present embodiment includes a first plasma treatment (atomization treatment) and a second plasma treatment (activation treatment) performed prior to the carbon nanotube formation. The atomization treatment is a process of converting a catalytic metal into fine articles, while suppressing the increase of the particles to a size larger than a size necessary for agglomeration by oxidizing the surfaces of the generated catalytic metal fine particles. The activation treatment is a process of reducing and activating the surfaces of the catalytic metal fine particles that may be subjected to the surface oxidation during the atomization treatment. In the present embodiment, the atomization treatment and the activation treatment are together referred to as a "pretreatment (method)" of the carbon nanotube formation. In the following description, by way of example, Ar gas is used as a plasma generation gas, $O_2$ gas is used as an oxygen-containing gas, $H_2$ gas is used as a hydrogen-containing gas, $N_2$ gas is used as an inert gas, and $C_2H_4$ gas is used as a carbon-containing gas.

Figure 5A:
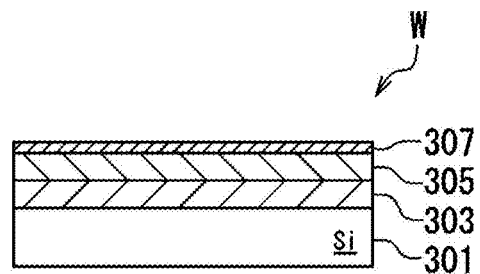
FIG. 5A is a schematic diagram of a wafer structure having a catalytic metal layer to be treated.

First, a wafer W having a catalytic metal layer formed thereon is prepared, and mounted on the stage 3 by opening the gate valve G1 of the treatment apparatus 100 and loading the wafer W into the treatment container 1. For example, a wafer in which a base layer 303, a base layer 305, and a catalytic metal layer 307 are sequentially stacked on the surface of a silicon substrate 301, as illustrated in FIG. 5A, is used as the wafer W.

Both the base layers 303 and 305 function as a film that prevents the catalytic metal from coarsening due to agglomeration. That is to say, the base layers 303 and 305 are co-catalytic layers that function as co-catalysts for the catalytic metal. The base layers 303 and 305 may be made of materials such as Al, AlN, Ti, $Al_2O_3$, TiN, Ta, TaN, $SiO_2$, SiN or the like, for example. Among the above materials, nitrides such as TiN, TaN, SiN, and AlN may be used in order to enhance the co-catalyst function. The base layers 303 and 305 may be formed by using well-known film forming techniques, for example, sputtering, vapor deposition, CVD and plating. The thicknesses of the base layers 303 and 305 may be in a range of, for example, 5 nm or more and 100 nm or less. The base layers 303 and 305 are not limited to two separate layers, and may be formed into a single layer. Any layer such as an insulating layer may be provided below the base layers 303 and 305.

The catalytic metal layer 307 is a metal film for forming the catalytic metal fine particles serving as nucleuses of a carbon nanotube growth. As metal forming the catalytic metal layer 307, transition metals such as Fe, Co, Ni, Ru, and Au or alloys containing the transition metals may be used, for example. The catalytic metal layer 307 may be formed by using well-known film forming techniques, for example, sputtering, vapor deposition, CVD and plating. The thickness of the catalytic metal layer 307 influences the size of the catalytic metal fine particles generated in the atomization treatment process (STEP 1), and may be in a range of 0.1 nm or more and 5 nm or less.

In addition to the wafer W which is a semiconductor substrate, a glass substrate and a plastic (polymeric) substrate, for example, may be used as a substrate as a treatment target.

<Step 1; Atomization Treatment>

Figure 5B:
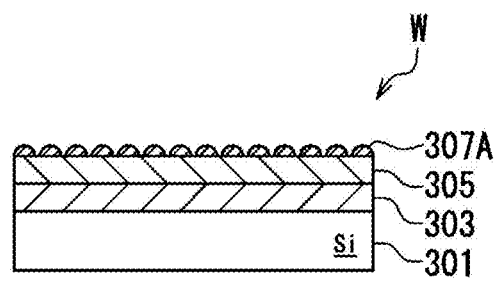
FIG. 5B is a schematic diagram illustrating a state where the catalytic metal layer is converted into fine particles by an atomization treatment.

In STEP 1, the catalytic metal layer 307 is subjected to the atomization treatment while heating the wafer W mounted on the stage 3. This treatment is a process of atomizing the catalytic metal layer 307 by the action of a plasma to generate catalytic metal fine particles 307A, as illustrated in FIG. 5B. In the atomization treatment, impurities such as organic material adhering to the surface of the catalytic metal layer 307 are removed by the plasma and metal atoms become easy to move. As a result, migration due to heat occurs on the surface of the catalytic metal layer 307 and the metal atoms forming the catalytic metal layer 307 properly agglomerate. As such, the atomization progresses. As described above, in the atomization treatment, enough energy to move metal atoms on the surface of the catalytic metal layer 307 is applied by the heat and the plasma, which changes the surface of the catalytic metal layer 307 into an island-shaped surface where a number of metal atoms are gathered to form islands (this is referred to as "agglomeration"). An oxygen plasma, an argon plasma or the like, for example, may be used in the atomization treatment. When using the oxygen plasma, the surfaces of the generated catalytic metal fine particles 307A are oxidized by the oxygen plasma and an excessive increase of the particles in size due to the agglomeration is suppressed, which allows control of the particle size.

The diameter of the catalytic metal fine particles 307A formed in STEP 1 may be, for example, approximately 1 nm or more and 50 nm or less. The thinner the initial film thickness of the catalytic metal layer 307 is, the smaller the size of the islands to be formed is, and the smaller the diameter of the catalytic metal fine particles 307A is. For example, the diameter of the generated catalyst metal fine particles 307A is about 10 nm when the initial film thickness of the catalytic metal layer 307 is 1 nm, and about 20 nm when the initial film thickness of the catalytic metal layer 307 is 2 nm.

In STEP 1, the Ar gas (adding the $O_2$ gas and the like, if necessary) is introduced into the treatment container 1 from the shower ring 57. Further, the microwave generated by the microwave generation unit 35 is guided to the planar antenna 33 via the waveguide 47 and the coaxial waveguide 49 in a predetermined mode, and is introduced into the treatment container 1 through the microwave radiation holes 33a of the planar antenna 33 and the transmission plate 39. The microwave converts the Ar gas (adding the $O_2$ gas and the like, if necessary) into a plasma and the atomization treatment is performed, thereby converting the catalytic metal layer 307 of the wafer W surface into the catalytic metal fine particles 307A.

A temperature $T_1$ of the wafer W during the atomization treatment may be, for example, in a range of 100 degrees C. or more and 450 degrees C. or less. The temperature $T_1$ may be within a range of 250 degrees C. or more and 350 degrees C. or less. If the temperature $T_1$ is less than 100 degrees C., the atomization of the catalytic metal layer 307 does not progress sufficiently. If the temperature exceeds 450 degrees C., the catalytic metal fine particles 307A may further agglomerate and may be excessively enlarged.

From the viewpoint of increasing generation of radicals in the plasma, the pressure in the treatment container 1 may be, for example, in a range of 66.7 Pa or more and 400 Pa or less (0.5 to 3 Torr). The pressure may be in a range of 133 Pa or more and 266 Pa or less (1 to 2 Torr).

In order to generate stable plasma, from the viewpoint of enhancing the active species generation efficiency in the case of adding the $O_2$ gas and the like, the Ar gas flow rate may be, for example, in a range of 100 mL/min (sccm) or more and 2000 mL/min (sccm) or less. The flow rate may be in a range of 300 mL/min (sccm) or more and 1000 mL/min (sccm) or less.

When adding the $O_2$ gas and the like, from the viewpoint of suppressing the excessive oxidation of the catalytic metal fine particles 307A, the flow rate of the additional gas may be, for example, in a range of 50 mL/min (sccm) or more and 500 mL/min (sccm) or less. The flow rate may be in a range of 100 mL/min (sccm) or more and 200 mL/min (sccm) or less.

In order to stably generate the plasma, from the viewpoints of efficiently generating the active species in the plasma in the case of adding the $O_2$ gas and the like and enabling the carbon nanotube generation at a low temperature, the microwave power may be, for example, in a range of 500 W or more and 4000 W or less. The microwave power may be in a range of 500 W or more and 2000 W or less.

From the viewpoint of optimizing the atomization from the catalytic metal layer 307 to the catalytic metal fine particles 307A, the treatment time may be, for example, in a range of 1 minute or more and 20 minutes or less. The treatment time may be in a range of 5 minutes or more and 10 minutes or less.

When terminating the atomization treatment of STEP 1, the supply of the microwave is first stopped, and the supply of the $O_2$ gas is stopped if it is supplied. In place of the $O_2$ gas, the additional gas in the atomization treatment may include, for example, $H_2O$, $O_3$, $N_2O$ or the like.

<Step 2: Activation Treatment>

Figure 5C:
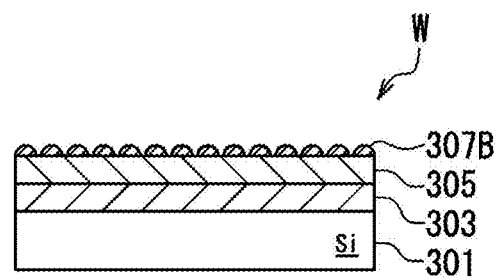
FIG. 5C is a schematic diagram illustrating a state where the catalytic metal fine particles are activated by an activation treatment.

Next, the activation treatment is performed in STEP 2. In the activation treatment, a plasma of a reducing gas mixture containing a hydrogen-containing gas (for example, a hydrogen gas) and a nitrogen gas is used. The activation treatment is performed after STEP 1, and reduces and activates the surfaces of the catalytic metal fine particles 307A formed by the atomization treatment of STEP 1 using the plasma of the reducing gas mixture (the activation treatment). In FIG. 5C, the activated catalytic metal fine particles after the activation treatment are indicated by reference numeral 307B. By performing the activation treatment, the activated catalytic metal fine particles 307B can have high density while maintaining the state of the fine particles. In the activation treatment, in addition to the activation of the catalytic metal fine particles 307A, the base layer 305 can be nitrided by using the plasma of the reducing gas mixture containing the hydrogen-containing gas and the nitrogen gas, if the base layer 305 is formed of a nitride such as TiN, TaN, SiN, and AlN. That is to say, disturbance in composition of the nitride such as TiN and TaN constituting the co-catalytic layer (for example, a state where an oxide such as TiON and TaON is formed) can be corrected by the nitridation, which brings the nitride close to the stoichiometric ratio and improves the co-catalytic function significantly. Therefore, since the agglomeration of the activated catalytic metal fine particles 307B is suppressed, the activation ratio of the activated catalytic metal fine particles 307B can be improved and the high-density carbon nanotube can be formed in the following STEP 3.

In STEP 2, after terminating the atomization treatment of STEP 1, while allowing the Ar gas to flow, the microwave is guided to the planar antenna 33 through the waveguide 47 and the coaxial waveguide 49 from the microwave generation unit 35 and introduced into the treatment container 1 through the transmission plate 39. The microwave converts the Ar gas into a plasma. The $H_2$ gas and the $N_2$ gas are introduced into the treatment container 1 via the shower plate 59 when the plasma is ignited, and the $H_2$ gas and the $N_2$ gas are converted into a plasma by the Ar plasma. The activation treatment using the generated microwave plasma is performed on the surfaces of the catalytic metal fine particles 307A, thereby reducing the oxide films (not illustrated) on the surfaces of the catalytic metal fine particles 307A and changing the catalytic metal fine particles 307A to the activated catalytic metal fine particles 307B. Furthermore, the co-catalyst function can be improved by performing the nitridation on the base layer 305 serving as the co-catalytic layer.

From the viewpoint of preventing an excessive enlargement of the particles while activating the catalytic metal fine particles 307A, the temperature $T_2$ of the wafer W during the activation treatment may be, for example, in a range of 100 degrees C. or more and 550 degrees C. or less. The temperature $T_2$ may be in a range of 250 degrees C. or more and 550 degrees C. or less. If the temperature $T_2$ is less than 100 degrees C., the reduction of the oxide films on the surfaces of the catalytic metal fine particles 307A does not sufficiently progress and thus the activation becomes insufficient. If the temperature $T_2$ exceeds 550 degrees C., the activated catalytic metal fine particles 307B may further agglomerate and may be excessively enlarged. The temperature $T_2$ in the activation treatment may be higher than the temperature $T_1$ in the atomization treatment ($T_2>T_1$), which will be described later.

From the viewpoint of increasing generation of radicals in the plasma, the pressure in the treatment container 1 may be, for example, in a range of 66.7 Pa or more and 400 Pa or less (0.5 to 3 Torr). The pressure may be in a range of 66.7 Pa or more and 133 Pa or less (0.5 to 1 Torr).

From the viewpoint of achieving efficient generation of the active species in the plasma, the $H_2$ gas flow rate may be, for example, in a range of 100 mL/min (sccm) or more and 2000 mL/min (sccm) or less. The $H_2$ gas flow rate may be, for example, in a range of 100 mL/min (sccm) or more and 500 mL/min (sccm) or less.

From the viewpoint of achieving the efficient generation of the active species in the plasma, the $N_2$ gas flow rate may be, for example, in a range of 10 mL/min (sccm) or more and 2000 mL/min (sccm) or less. The $N_2$ gas flow rate may be, for example, in a range of 20 mL/min (sccm) or more and 1000 mL/min (sccm) or less.

From the viewpoint of enhancing the efficiency of the generation of active species in the plasma, the Ar gas flow rate may be, for example, in a range of 100 mL/min (sccm) or more and 2000 mL/min (sccm) or less. The Ar gas flow rate may be, for example, in a range of 300 mL/min (sccm) or more and 1000 mL/min (sccm) or less.

In the activation treatment, when the base layer 305 is formed of a nitride, the ratio of $H_2$ gas to $N_2$ gas ($H_2:N_2$) may be in a range of 10:1 to 1:5, in order to enhance the co-catalyst function by nitriding the base layer 305 and enhance the activation ratio in the activated catalytic metal fine particles 307B. The ratio of $H_2$ gas to $N_2$ gas may be in a range of 1:1 to 1:3.

From the viewpoints of efficiently generating the active species in the plasma and generating the carbon nanotube at a low temperature, the microwave power may be, for example, in a range of 500 W or more and 4000 W or less. The microwave power may be in a range of 500 W or more and 1500 W or less. The vertical orientation of the carbon nanotube can be improved by setting the microwave power in a range of 500 W or more and 1000 W or less. Therefore, the microwave power may be in a range of 500 W or more and 1000 W or less.

From the viewpoints of activating the catalytic metal fine particles 307A while suppressing the agglomeration thereof and increasing the density of the activated catalytic metal fine particles 307B, the treatment time may be, for example, in a range of 1 minute or more and 15 minutes or less. The treatment time may be in a range of 5 minutes or more and 10 minutes or less.

When terminating the activation treatment of STEP 2, the supply of the microwave is first stopped, and the supply of the $H_2$ gas and the supply of the $N_2$ gas are stopped. In place of the $H_2$ gas, the hydrogen-containing gas in the activation treatment may include $NH_3$ gas or the like.

<Step 3: Carbon Nanotube Formation>

Next, the carbon nanotube is formed in STEP 3. In order to prevent the activated catalytic metal fine particles 307B activated by the activation treatment from being inactivated, the carbon nanotube may be formed subsequently to the activation treatment of STEP 2. The carbon nanotube formation may be performed consecutively to the activation treatment in the same treatment container as the activation treatment. The carbon nanotube can be formed in the treatment apparatus 100 by, for example, a thermal CVD method, a plasma CVD method or the like. Hereinafter, a case of performing the treatment of STEP 3 by the thermal CVD method and a case of performing the treatment by the plasma CVD method will be separately described.

<Thermal CVD Method>

Figure 5D:
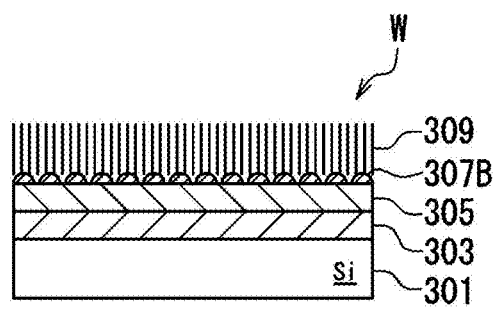
FIG. 5D is a diagram schematically illustrating a state where a carbon nanotube is formed.

After the activation treatment of STEP 2, while supplying the Ar gas, the $C_2H_4$ gas is introduced into the treatment container 1 through the shower plate 59 using the $N_2$ gas or the $H_2$ gas as a carrier gas. The $C_2H_4$ gas is thermally decomposed in the space S2, thereby forming a carbon nanotube 309 on the activated catalytic metal fine particles 307B as illustrated in FIG. 5D.

From the viewpoint of achieving a low-temperature process, a temperature $T_3$ of the wafer W during the growth treatment of the carbon nanotube 309 using the thermal CVD method may be, for example, in a range of 300 degrees C. or more and 550 degrees C. or less. The temperature $T_3$ may be in a range of 300 degrees C. or more and 500 degrees C. or less. In the present embodiment, by performing the atomization treatment of STEP 1 and the activation treatment of STEP 2 as the pretreatments, the carbon nanotube 309 can be grown at a low temperature of 550 degrees C. or less, and in some embodiments, in a range of 300 degrees C. or more and 550 degrees C. or less. The temperature $T_3$ may be different from the temperature $T_2$ in the activation treatment (STEP 2) or may be the same as the temperature $T_2$. When the temperature $T_3$ is the same as the temperature $T_2$ in the activation treatment (STEP 2), the throughput can be increased.

From the viewpoint of maintaining a sufficient carbon nanotube growth rate, the pressure in the treatment container 1 may be, for example, in a range of 66.7 Pa or more and 667 Pa or less (0.5 to 5 Torr). The pressure may be in a range of 400 Pa or more and 667 Pa or less (3 to 5 Torr).

From the viewpoint of efficiently growing the carbon nanotubes 309, the $C_2H_4$ gas flow rate may be, for example, in a range of 5 mL/min (sccm) or more and 200 mL/min (sccm) or less. The $C_2H_4$ gas flow rate may be in a range of 6 mL/min (sccm) or more and 30 mL/min (sccm) or less.

Introduction of an Ar gas and a $N_2$ gas or a $H_2$ gas along with the $C_2H_4$ gas into the treatment container 1 may increase the growth rate of the carbon nanotube 309 and improve the quality of the carbon nanotube 309. The introduction of the Ar gas and the $H_2$ gas or the $N_2$ gas may be performed optionally. When introducing the Ar gas, from the viewpoint of efficiently growing the carbon nanotube 309, the Ar gas flow rate may be, for example, in a range of 100 mL/min (sccm) or more and 2000 mL/min (sccm) or less. The Ar gas flow rate may be in a range of 300 mL/min (sccm) or more and 1000 mL/min (sccm) or less. When introducing the $N_2$ gas or the $H_2$ gas, from the viewpoint of efficiently growing the carbon nanotube 309, the flow rate of the $N_2$ gas of the $H_2$ gas may be, for example, in a range of 100 mL/min (sccm) or more and 1000 m L/min (sccm) or less. The flow rate of the $N_2$ gas of the $H_2$ gas may be in a range of 100 mL/min (sccm) or more and 300 mL/min (sccm) or less.

From the viewpoint of growing the carbon nanotube 309 to a sufficient length while preventing lowering of the catalytic activity, the treatment time may be, for example, in a range of 10 minutes or more and 120 minutes or less. The treatment time may be in a range of 30 minutes or more and 90 minutes or less.

In the formation of the carbon nanotube 309 using the thermal CVD method, hydrocarbon gases other than the ethylene ($C_2H_4$) gas, for example, methane ($CH_4$), ethane ($C_2H_6$), propane ($C_3H_8$), propylene ($C_3H_6$) and acetylene ($C_2H_2$) may be used, or carbon-containing gases such as methanol ($CH_3OH$) and ethanol ($C_2H_5OH$) may be used. Further, in place of the Ar gas, other rare gases such as He, Ne, Kr and Xe, for example, may be used. Furthermore, by introducing, in addition to the carbon-containing gas, an inert gas such as $N_2$, a reducing gas such as $H_2$ and $NH_3$, and an oxidizing gas such as $O_2$, $O_3$, $H_2O$ and $N_2O$ into the treatment container 1, the growth rate of the carbon nanotube 309 can be increased and the quality of the carbon nanotube 309 can be improved.

In the thermal CVD method, the carbon nanotube 309 grows while maintaining the characteristics of the activated catalytic metal fine particles 307B. Thus, the high-density carbon nanotube 309 can be formed on the activated catalytic metal fine particles 307B having been activated and highly densified by the activation treatment of STEP 2, while being oriented substantially perpendicular to the surface of the wafer W (the base layer 305). In the present embodiment, the carbon nanotube 309 can be formed at a temperature of 550 degrees C., which is much lower than the conventional thermal CVD method. In addition, since the carbon nanotube 309 is not damaged due to electrons or ions in the thermal CVD method, crystal defects and introduction of impurities can be suppressed. Therefore, the carbon nanotube 309 with fewer impurities, a high G/D ratio and good crystallinity can be formed.

<Plasma CVD Method>

After the activation treatment of STEP 2, while flowing the Ar gas at a predetermined flow rate, the microwave is introduced into the planar antenna 33 from the microwave generation unit 35 through the waveguide 47 and the coaxial waveguide 49 and introduced into the treatment container 1 through the transmission plate 39. The microwave converts the Ar gas into a plasma. The $C_2H_4$ gas and, if necessary, the $H_2$ gas are introduced into the treatment container 1 through the shower plate 59 when the plasma is ignited. The $C_2H_4$ gas (and the $H_2$ gas) is converted into a plasma by the Ar plasma. The carbon nanotube 309 is formed on the activated catalytic metal fine particles 307B by thus generated microwave plasma, as illustrated in FIG. 5D.

From the viewpoint of achieving a low temperature process, the temperature $T_3$ of the wafer W during the growth treatment of the carbon nanotube 309 using the plasma CVD method may be, for example, in a range of 100 degrees C. or more and 550 degrees C. or less. The temperature $T_3$ may be in a range of 100 degrees C. or more and 350 degrees C. or less. In the present embodiment, by performing the atomization treatment of STEP 1 and the activation treatment of STEP 2 as the pretreatments, the carbon nanotube 309 can be grown at a temperature of 550 degrees C. or less, and in some embodiments, 350 degrees C. or less. The temperature $T_3$ may be different from the temperature $T_2$ in the activation treatment (STEP 2), or may be the same as the temperature $T_2$. If the temperature $T_3$ is the same as the temperature $T_2$ in the activation treatment (STEP 2), the throughput can be increased.

From the viewpoint of increasing generation of radicals in the plasma, the pressure in the treatment container 1 may be, for example, in a range of 66.7 Pa or more and 400 Pa or less (0.5 to 3 Torr). The pressure may be in a range of 266 Pa or more and 400 Pa or less (2 to 3 Torr).

From the viewpoint of efficiently generating the active species in the plasma, the $C_2H_4$ gas flow rate may be, for example, in a range of 5 mL/min (sccm) or more and 200 mL/min (sccm) or less. The $C_2H_4$ gas flow rate may be in a range of 6 mL/min (sccm) or more and 30 mL/min (sccm) or less.

From the viewpoint of stably generating the plasma, the Ar gas flow rate may be, for example, in a range of 100 mL/min (sccm) or more and 2000 mL/min (sccm) or less. The Ar gas flow rate may be in a range of 300 mL/min (sccm) or more and 1000 mL/min (sccm) or less.

Introduction of the $H_2$ gas along with the $C_2H_4$ gas into the treatment container 1 may increase the growth rate of the carbon nanotube 309 and improve the quality of the carbon nanotube 309. The introduction of the $H_2$ gas may be performed optionally. When introducing the $H_2$ gas, from the viewpoint of efficiently generating the active species in the plasma, the $H_2$ gas flow rate may be, for example, in a range of 100 mL/min (sccm) or more and 2000 mL/min (sccm) or less. The $H_2$ gas flow rate may be in a range of 300 mL/min (sccm) or more and 1200 mL/min (sccm) is or less.

From the viewpoint of facilitating the growth of carbon nanotube 309 by efficiently generating the active species, the microwave power may be, for example, in a range of 500 W or more and 4000 W or less. The microwave power may be in a range of 500 W or more and 1500 W or less.

From the viewpoint of growing the carbon nanotube 309 to a sufficient length while preventing lowering of the catalytic activity, the treatment time may be, for example, in a range of 1 minute or more and 60 minutes or less. The treatment time may be in a range of 5 minutes or more and 30 minutes or less.

In the formation of the carbon nanotube 309 using the plasma CVD method, hydrocarbon gases other than the ethylene ($C_2H_4$) gas, for example, methane ($CH_4$), ethane ($C_2H_6$), propane ($C_3H_8$), propylene ($C_3H_6$) and acetylene ($C_2H_2$) may be used, or carbon-containing gas such as methanol ($CH_3OH$) and ethanol ($C_2H_5OH$) may be used. Further, in place of the plasma generation Ar gas, an inert gas such as $N_2$, He, Ne, Kr and Xe may be used. Furthermore, by introducing, in addition to the carbon-containing gas and the rare gas, a reducing gas such as $H_2$ and $NH_3$ or an oxidizing gas such as $O_2$, $O_3$, $H_2O$ and $N_2O$ into the treatment container 1, the growth rate of the carbon nanotube 309 can be increased and the quality of the carbon nanotube 309 can be improved.

In the plasma CVD method, the carbon nanotube 309 grows while maintaining the characteristics of the activated catalytic metal fine particles 307B. Thus, the high-density carbon nanotube 309 can be formed on the activated catalytic metal fine particles 307B having been activated and highly densified by the activation treatment of STEP 2, while being oriented substantially perpendicular to the surface of the wafer W (the base layer 305). In addition, the plasma CVD method can form the carbon nanotube 309 even at a low temperature in a range of 100 degrees C. or more and 350 degrees C. or less. Therefore, the carbon nanotube 309 can be formed on a substrate having a low heat resistance, for example, a glass substrate and a synthetic resin (polymeric) substrate.

After forming the carbon nanotube 309 by the processes of STEP 1 to STEP 3 described above, the supply of the microwave (in the case of the plasma CVD method) and the supply of the gases are stopped, and the inner pressure of the treatment container 1 is adjusted. Then, the gate valve G1 is open and the wafer W is unloaded. The carbon nanotube formation method according to the present embodiment may include optional processes other than STEP 1 to STEP 3 described above. For example, between the processes of STEP 1 and STEP 2 or between the process of STEP 2 and STEP 3, after quickly exhausting the interior of the treatment container 1 using the exhaust device 99, a process of purging the interior of the treatment container 1 by flowing the Ar gas or the $N_2$ gas may be performed.

<Pretreatment Temperature>

Next, the relationship between the temperature $T_1$ in the atomization treatment of STEP 1 and the temperature $T_2$ in the activation treatment of STEP 2 performed as the pre-treatments will be described. By performing the atomization treatment of STEP 1 at the temperature $T_1$ that is relatively lower than the temperature $T_2$ in the activation treatment of STEP 2 (i.e., T2>T1), agglomeration of the generated catalytic metal fine particles 307A can be suppressed during the atomization of the catalytic metal layer 307. Meanwhile, by performing the activation treatment of STEP 2 at the temperature $T_2$ that is relatively higher than the temperature $T_1$ in the atomization treatment, the surfaces of the catalytic metal fine particles 307A can be efficiently reduced and become a high activity state. In this manner, by providing a difference in the treatment temperatures between STEP 1 and STEP 2, the effects of the atomization treatment and the activation treatment can be maximized.

The temperature $T_1$ is in the range of 100 degrees C. or more and 450 degrees C. or less and the temperature $T_2$ is in the range of 100 degrees C. or more and 550 degrees C. or less, as described above, and the temperature difference (T2−T1) between the temperature $T_2$ and the temperature $T_1$ may be 50 degrees C. or more. The temperature difference (T2−T1) may be 100 degrees C. or less. By setting the temperature difference (T2−T1) to 50 degrees C. or more, the boundary between STEP 1 and STEP 2 can be clarified, thereby maximizing the effects of each treatment. That is to say, by providing the temperature difference (T2−T1), the atomization of the catalytic metal (and, in the case of using an oxygen plasma, suppression of the agglomeration due to the surface oxidation of the generated catalytic metal fine particles 307A) in the atomization treatment of STEP 1 and the activation (reduction of the oxidized surfaces) of the catalytic metal fine particles 307A in the activation treatment of STEP 2 can be reliably performed, respectively.

The transition from STEP 1 to STEP 2 may be performed so that the temperature change of the wafer W occurs in a stepwise manner in the course of transition from the temperature $T_1$ to the temperature $T_2$. Here, the expression "temperature changes in a stepwise manner" means that the temperature of the wafer W is raised with a rapid temperature change of at least 100 degrees C./min or more (in some embodiments, in a range of 200 degrees C./min or more and 300 degrees C./min or less) during the transition from STEP 1 to STEP 2, rather than slowly and incrementally increasing the temperature.

As examples of methods for generating the temperature change of the wafer W from the temperature $T_1$ to the temperature $T_2$ in a stepwise manner, a first method and a second method will be described below.

<First Method>

The first method uses a plurality of stages 3. In the first method, the wafer W is transferred within a short time from a stage 3 that is set to be heated to the temperature $T_1$ to another stage 3 that is set to be heated to the temperature $T_2$. The first method may be performed, for example, in the multi-chamber type treatment system 200 as illustrated in FIG. 3. For example, in the treatment system 200 of FIG. 3, the wafer W is subjected to the atomization treatment of STEP 1 at the temperature $T_1$ in the stage 3A of the process module 100A, and after terminating the atomization treatment, the wafer W is transferred to one of the stages 3B to 3D of the process modules 100B to 100D by the transfer device 209 and then subjected to the activation treatment at the temperature $T_2$. Here, one of the stages 3B to 3D of the process modules 100B to 100D into which the wafer W is loaded is set so that the heating temperature of the wafer W becomes the temperature $T_2$. As described above, the temperature of the wafer W can be raised in a stepwise manner, by immediately transferring the wafer W for which the treatment of STEP 1 is finished at the temperature $T_1$ to another chamber and performing the treatment of STEP 2 at the temperature $T_2$.

Figure 6:
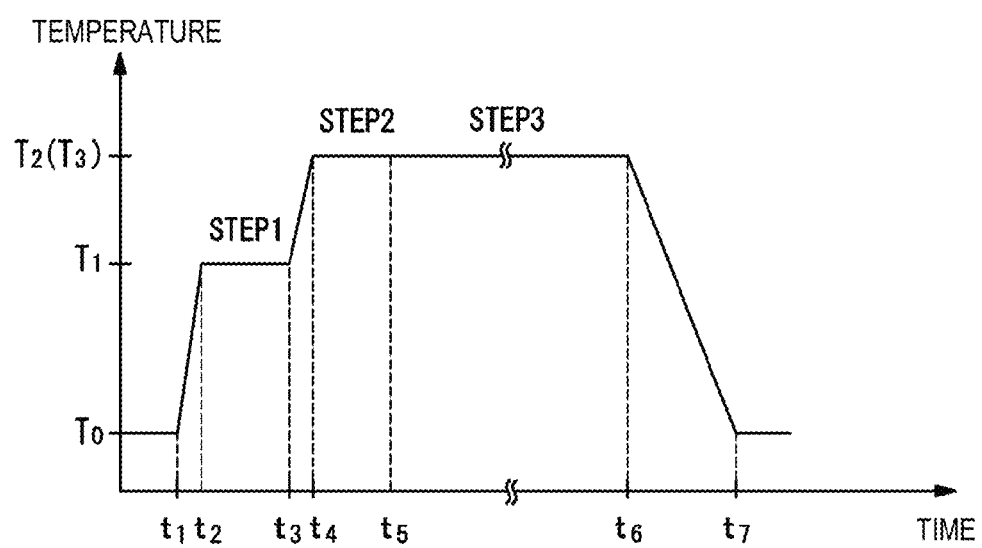
FIG. 6 is a graph illustrating an example of a temperature change of a wafer W when forming the carbon nanotube.

An example of a temperature change of the wafer W in the first method is illustrated in FIG. 6. First, the wafer W of the initial temperature $T_0$ is mounted, for example, on the stage 3A of the process module 100A at the time $T_1$. The output of the heater power supply 29 to the heater 27 is set so that the stage 3A can heat the wafer W to the temperature $T_1$. During the time period from the time $t_1$ to the time $t_2$, the temperature of the wafer W is raised from the initial temperature $T_0$ to the temperature $T_1$ for the atomization treatment of STEP 1. Then, the atomization treatment is performed during the time period from the time $t_2$, at which the temperature of the wafer W reaches the temperature Ti, to the time $t_3$.

When the atomization treatment of STEP 1 is finished, the wafer W is unloaded from the process module 100A and transferred to, for example, the stage 3B of the process module 100B by the transfer device 209. The output of the heater power supply 29 to the heater 27 is set so that the stage 3B can heat the wafer W to the temperature $T_2$. Although the temperature of the wafer W slightly decreases while the wafer W is unloaded from the process module 100A and loaded into the process module 100B, the decrease is within a negligible range because the wafer W is transferred quickly by the transfer device 209. Thus, the decrease is not illustrated in FIG. 6. The wafer W mounted on the stage 3B of the process module 100B is rapidly heated to the temperature $T_2$ during the time period from the time $t_3$ to the time $t_4$. The heating rate of the wafer W from the time $t_3$ to the time $t_4$ is set to be at least 100 degrees C./min or more as described above. The shorter the time period from the time $t_3$ to the time $t_4$ is better.

Next, the activation treatment of STEP 2 is performed at the temperature $T_2$ during the time period from the time $t_4$ to the time $t_5$. When the activation treatment is finished, the forming treatment of the carbon nanotube 309 of STEP 3 is consecutively performed during the time period from the time $t_5$ to the time $t_6$ by using the thermal CVD method or the plasma CVD method, while maintaining the temperature $T_2$ (identical to the temperature $T_3$ in this case). The temperature $T_3$ in the forming treatment of the carbon nanotube 309 may be the same as the temperature $T_2$, or may be different therefrom. When the formation of carbon nanotube 309 is finished at the time $t_6$, the wafer W is unloaded from the process module 100B by the transfer device 209 and is accommodated in one of the load ports LP by the transfer device 217 via the load-lock chamber 205a or 205b. Thereafter, through a cooling procedure until the time $t_7$, the temperature of the wafer W returns to the initial temperature $T_0$.

<Second Method>

The second method uses one stage 3 for generating a stepwise change in the temperature from $T_1$ to $T_2$ between STEP 1 and STEP 2. In the second method, the wafer W is once transferred from the stage 3 to another location after performing the atomization treatment at the temperature $T_1$, and the output from the heater power supply 29 to the heater 27 is adjusted to raise the temperature of the stage 3 so that the wafer W can be heated to the temperature $T_2$. In this state, the wafer W is returned to the stage 3. The wafer W returned to the stage 3 is heated to the temperature $T_2$ at the heating rate of at least 100 degrees C./min or more. The temperature of the wafer W may be lowered to a temperature lower than the temperature $T_1$, while holding the wafer W in another location between STEP 1 and STEP 2.

According to the second method, in the treatment system 200 illustrated in FIG. 3, the wafer W is subjected to the atomization treatment of STEP 1 at the temperature $T_1$, for example, in the stage 3A of the process module 100A, and after terminating the atomization treatment, the wafer W is transferred from the process module 100A to the load-lock chamber 205a (or 205b) and is mounted on the stage 206a (or 206b) by the transfer device 209. While the wafer W is under a standby state in the load-lock chamber 205a (or 205b), an electric power is supplied to the heater 27 from the heater power supply 29 to heat the stage 3A. When the temperature of the stage 3A rises so that the wafer W can be heated to the temperature $T_2$, the wafer W is loaded again into the process module 100A and mounted on the stage 3A by the transfer device 209. Without being limited to the multi-chamber type treatment system 200 as illustrated in FIG. 3, the second method can be similarly performed in a single-chamber type treatment apparatus equipped with a load-lock chamber. Further, the location where the wafer W is under the standby state is not limited to the load-lock chamber, and any location where the wafer W can be held may be available.

Figure 7:
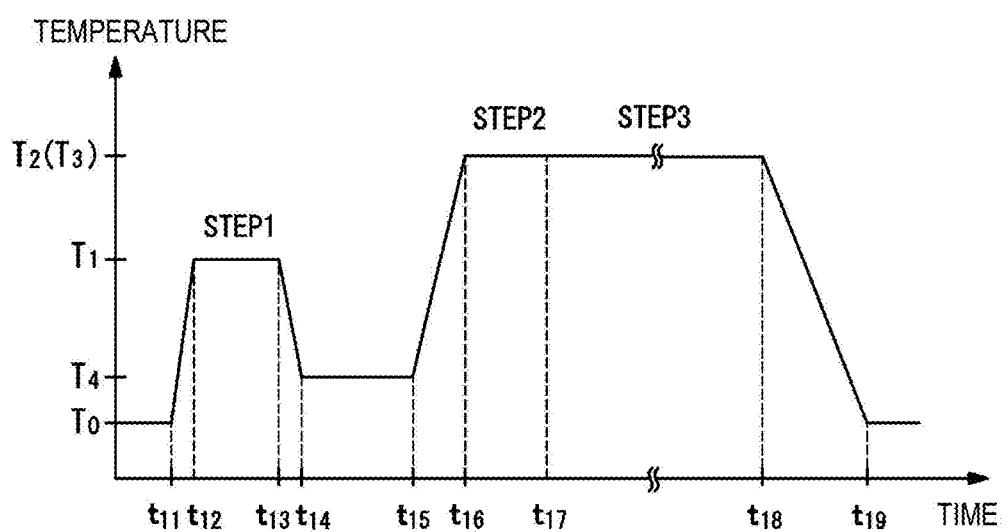
FIG. 7 is a graph illustrating another example of the temperature change of the wafer W when forming the carbon nanotube.

An example of the temperature change of the wafer W in the second method is illustrated in FIG. 7. First, the wafer W of the initial temperature $T_0$ is mounted on the stage 3A of the process module 100A at the time $t_{11}$. The output of the heater power supply 29 to the heater 27 is set so that the stage 3A can heat the wafer W to the temperature $T_1$. During the time period from the time $t_{11}$ to the time $t_{12}$, the temperature of the wafer W is raised from the initial temperature $T_0$ to the temperature $T_1$ for the atomization treatment of STEP 1. The atomization treatment is performed at the temperature $T_1$ during the time period from the time $t_{12}$ to the time $t_{13}$.

When the atomization treatment of STEP 1 is finished, the wafer W is unloaded from the process module 100A, and transferred to the load lock chamber 205a (or 205b), Then, the wafer W is mounted on the stage 206a (or 206b). The output from the heater power supply 29 to the heater 27 is increased to raise the temperature of the stage 3A in the process module 100A from which the wafer W is unloaded. The temperature of the stage 3A is raised until the wafer W can be heated to the temperature $T_2$.

The wafer W unloaded from the process module 100A and temporarily accommodated in the load-lock chamber 205a (or 205b) under the standby state is cooled to the temperature $T_4$ between the time $t_{13}$ and the time $t_{14}$, and then the temperature of the wafer W is maintained at the same temperature from the time $t_{14}$ to the time $t_{15}$. The temperature $T_4$ may be, for example, approximately 100 degrees C. During the time period from the time $t_{14}$ to the time $t_{15}$, it is not necessary to perform a temperature control and the temperature $T_4$ may not be maintained.

Then, when the temperature of the stage 3A of the process module 100A rises sufficiently, the wafer W is returned to the stage 3A of the process module 100A from the load-lock chamber 205a (or 205b). The wafer W mounted on the stage 3A is rapidly heated to the temperature $T_2$ between the time $t_{15}$ to the time $t_{16}$. As described above, the heating of the wafer W during the time period from the time $t_{15}$ to the time $t_{16}$ includes at least a heating section showing the heating rate of at least 100 degrees C./min or more. The shorter the time period from the time $t_{15}$ to the time $t_{16}$ the better.

Next, the activation treatment of STEP 2 is performed at the temperature $T_2$ during the time period from the time $t_{16}$ to the time $t_{17}$. When the activation treatment is finished, the forming treatment of the carbon nanotube 309 of STEP 3 is consecutively performed by using the thermal CVD method or the plasma CVD method during the time period from the time $t_{17}$ to the time $t_{18}$, while maintaining the temperature $T_2$ (identical to the temperature $T_3$ in this case). The temperature $T_3$ in the forming treatment of the carbon nanotube 309 may be the same as the temperature $T_2$ or may be different therefrom. When the formation of the carbon nanotube 309 is finished, the wafer W is unloaded from the process module 100A, and is accommodated in one of the load ports LP by the transfer device 217 via the load-lock chamber 205a or 205b. Thereafter, through a cooling procedure until the time $t_{19}$, the temperature of the wafer W returns to the initial temperature $T_0$.

As described above, by adopting the method for generating a stepwise change in temperature of the wafer W from the temperature $T_1$ to $T_2$, the atomization treatment of STEP 1 and the activation treatment of STEP 2 can be clearly distinguished from the view point of temperature management. Thus, the atomization of the catalytic metal layer 307 (and the surface oxidation in the case of using the oxygen plasma) can properly progress in STEP 1, and the catalytic metal fine particles 307A move into a high activity state in STEP 2 by efficiently reducing the particle surfaces of the generated catalytic metal fine particles 307A without causing excessive agglomeration. In the present embodiment, by providing a difference in the treatment temperatures between STEP 1 and STEP 2, the effect of performing a combination of the atomization treatment and the activation treatment can be maximized. Therefore, the high-density carbon nanotube 309 can be formed on the activated catalytic metal fine particles 307B having been activated and highly densified, while being oriented substantially perpendicular to the surface of the wafer W (the base layer 305).

The first and second methods are provided by way of example only, and the invention is not limited thereto. That is to say, as long as the temperature transition from the temperature $T_1$ to the temperature $T_2$ is performed in a stepwise manner as in the first and second methods, any apparatus of different configuration can be used and various modifications can also be made to the temperature hysteresis.

Since the carbon nanotube manufactured by the method according to the present embodiment shows high density and high vertical orientation, the carbon nanotube is very useful, for example, in applications such as via wiring of semiconductor devices, electron-emitting devices and carbon nanotube illumination devices.

Hereinafter, examples will be provided to describe the present invention in more detail, but the present invention is not limited thereto.

Example 1

<Carbon Nanotube Formation Using Thermal CVD Method (1)>

Similarly to FIG. 5A, a wafer W having the base layers 303 and 305 and the catalytic metal layer 307 stacked on the silicon substrate 301 was prepared. The base layer 303 was formed of TaN with the thickness of 10 nm. The base layer 305 was formed of TiN with the thickness of 5 nm. The catalytic metal layer 307 was formed of Co with the thickness of 2 nm. The wafer W was loaded into a treatment container of a treatment apparatus having the same configuration as the treatment apparatus 100 of FIG. 1, and the carbon nanotube was grown by the thermal CVD method after performing the atomization treatment and the activation treatment under the following conditions. By accommodating the wafer W in a load-lock chamber under the standby state between the atomization treatment and the activation treatment, the temperature change was performed in a stepwise manner where the temperature change from the temperature $T_1$ in the atomization treatment to the temperature $T_2$ in the activation treatment includes a heating procedure of 240 degrees C./min or more. The activation treatment and the carbon nanotube formation were performed consecutively at the same temperature.

Figure 8:
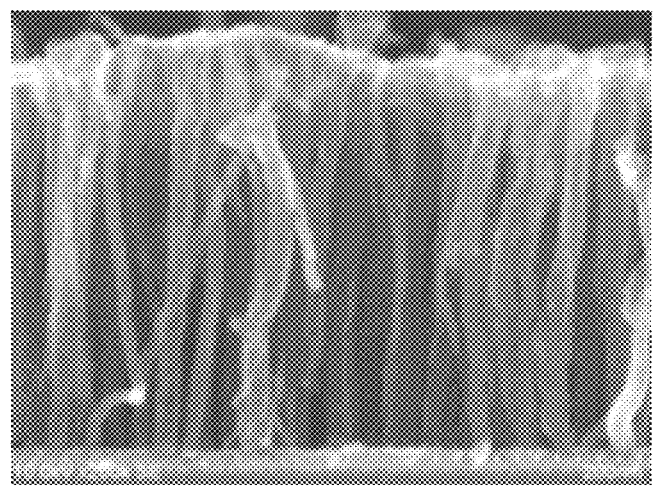
FIG. 8 is an SEM (Scanning Electron Microscope) photograph of a cross-section of a substrate illustrating result of a carbon nanotube formation experiment in Example 1.

<Atomization Treatment Conditions>
  Treatment pressure: 266 Pa (2 Torr)
  Treatment gas:
  $O_2$ gas 100 mL/min (sccm)
  Ar gas 450 mL/min (sccm)
  Microwave power: 2.0 kW
  Treatment temperature: 350 degrees C.
  Treatment time: 5 minutes
<Standby Conditions in Load-Lock Chamber>
  Standby time: approximately 30 minutes
  Standby temperature: 100 degrees C. (stable state)<
<Activation Treatment Conditions>
  Treatment pressure: 133 Pa (1 Torr)
  Treatment gas:
  $H_2$ gas 462 mL/min (sccm)
  $N_2$ gas 100 mL/min (sccm)
  Ar gas 450 mL/min (sccm)
  Microwave power: 2.8 kW
  Treatment temperature: 470 degrees C.
  Treatment time: 5 minutes
<Carbon Nanotube Formation Conditions>
  Treatment pressure: 400 Pa (3 Torr)
  Treatment gas:
  $C_2H_4$ gas 30 mL/min (sccm)
  $H_2$ gas 200 mL/min (sccm)
  Ar gas 450 mL/min (sccm)
  Treatment temperature: 470 degrees C.
  Treatment time: 60 minutes FIG. 8 illustrates an SEM image of the carbon nanotube grown in this manner. From FIG. 8, it was confirmed that the carbon nanotube was oriented in a substantially perpendicular state and was formed with an excellent high density.

Comparative Example 1

Figure 9:
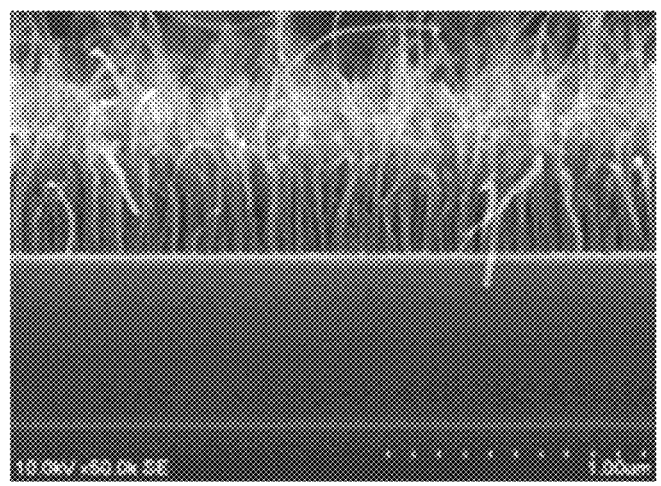
FIG. 9 is an SEM photograph of a cross-section of a substrate illustrating result of a carbon nanotube formation experiment in Comparative Example 1.

The carbon nanotube was formed in the same manner as in Example 1 except that the $N_2$ gas was not added in the activation treatment. FIG. 9 illustrates an SEM image of the grown carbon nanotube. From FIG. 9, it was found that the density of the carbon nanotube was low and the length of the carbon nanotube had many variations. The reason is considered that, since the TiN layer as the co-catalytic layer is not nitrided in the plasma of the $H_2$ gas only, the co-catalyst function does not sufficiently work in the activation treatment and the activation ratio due to the reduction of the catalytic metal fine particles is insufficient.

Example 2

<Carbon Nanotube Formation Using Thermal CVD Method (2)>

Figure 10A:
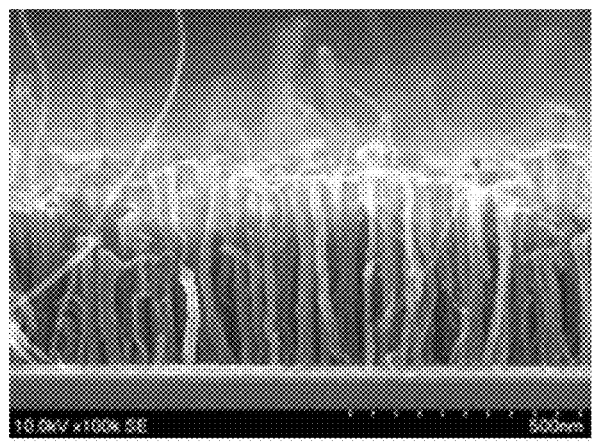
FIG. 10A is an SEM photograph of a cross-section of a substrate illustrating results of a carbon nanotube formation experiment (a microwave power of 0.5 kW) in Example 2.
Figure 10B:
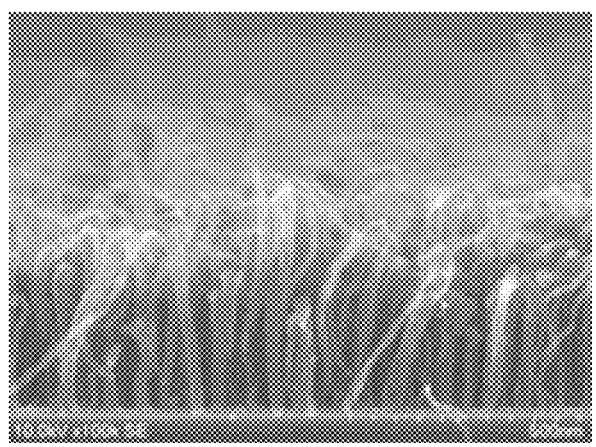
FIG. 10B is an SEM photograph of a cross-section of a substrate illustrating results of a carbon nanotube formation experiment (a microwave power of 1.0 kW) in Example 2.
Figure 10C:
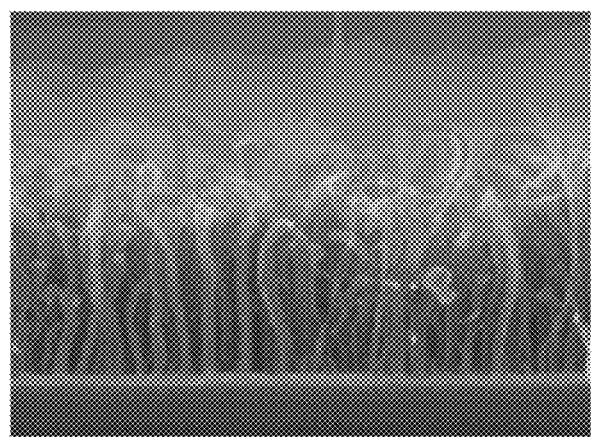
FIG. 10C is an SEM photograph of a cross-section of a substrate illustrating results of a carbon nanotube formation experiment (a microwave power of 1.5 kW) in Example 2.

The carbon nanotube was formed in the same manner as in Example 1 except that the microwave power in the activation treatment was changed to 0.5 kW, 1.0 kW or 1.5 kW. The carbon nanotubes grown under each condition were imaged by an SEM. The result of the microwave power of 0.5 kW is illustrated in FIG. 10A, the result of the microwave power of 1.0 kW is illustrated in FIG. 10B, and the result of the microwave power of 1.5 kW is illustrated in FIG. 10C. From the comparison of FIGS. 10A to 10C, although the high-density carbon nanotube was formed in every activation treatment condition (microwave power), it was found that the vertical orientation of the carbon nanotube was good in the case of using a small microwave power in the activation treatment.

Example 3

<Carbon Nanotube Formation Using Thermal CVD Method (3)>

Figure 11A:
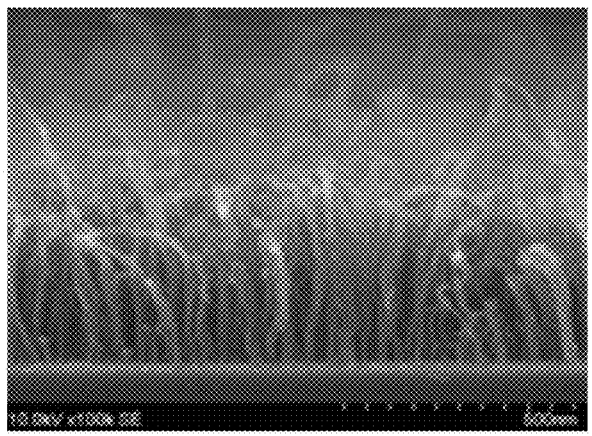
FIG. 11A is an SEM photograph of a cross-section of a substrate illustrating results of a carbon nanotube formation experiment (a N2 gas flow rate of 200 mL/min (sccm)) in Example 3.
Figure 11B:
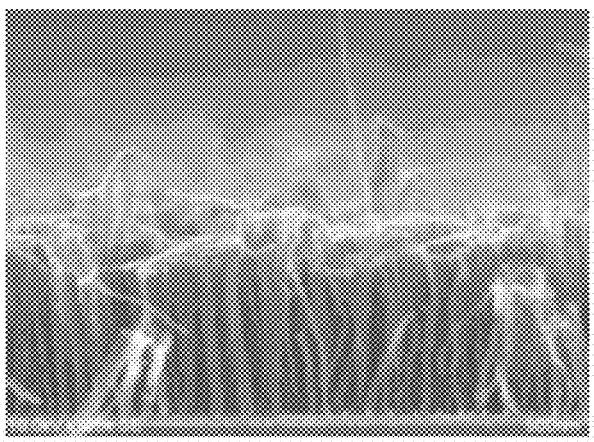
FIG. 11B is an SEM photograph of a cross-section of a substrate illustrating results of a carbon nanotube formation experiment (a N2 gas flow rate of 400 mL/min (sccm)) in Example 3.
Figure 11C:
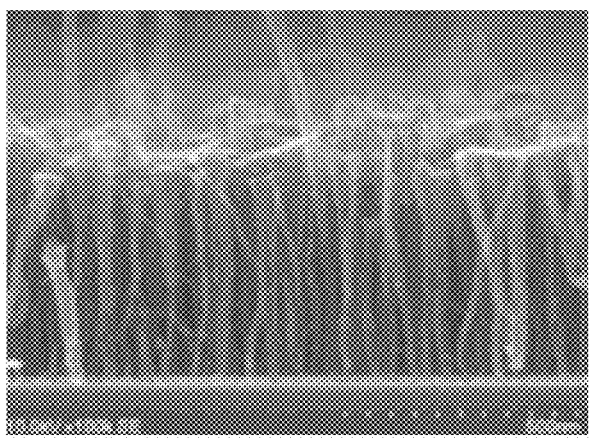
FIG. 11C is an SEM photograph of a cross-section of a substrate illustrating results of a carbon nanotube formation experiment (a N2 gas flow rate of 800 mL/min (sccm)) in Example 3.

The carbon nanotube was formed in the same manner as in Example 1 except that the microwave power in the activation treatment was changed to 0.5 kW and the flow rate of $N_2$ gas was changed to 100 mL/min (sccm), 200 mL/min (sccm), 400 mL/min (sccm) or 800 mL/min (sccm). The carbon nanotubes grown under each condition were imaged by an SEM. The result (identical to Example 2) of $N_2$ gas flow rate of 100 mL/min (sccm) is illustrated in FIG. 10A, the result of $N_2$ gas flow rate of 200 mL/min (sccm) is illustrated in FIG. 11A, the result of $N_2$ gas flow rate of 400 mL/min (sccm) is illustrated in FIG. 11B, and the result of $N_2$ gas flow rate of 800 mL/min (sccm) is illustrated in FIG. 11C. From the comparison of FIG. 10A and FIGS. 11A to 11C, although the high-density carbon nanotube was formed in every activation treatment condition ($N_2$ gas flow rate), it was found that, within the $N_2$ gas flow rate range of 100 to 800 mL/min (sccm), the carbon nanotube shows stable vertical orientation and has high density in the case of a large $N_2$ gas flow rate.

Example 4

Carbon Nanotube Formation Using Thermal CVD Method (4)

Figure 12A:
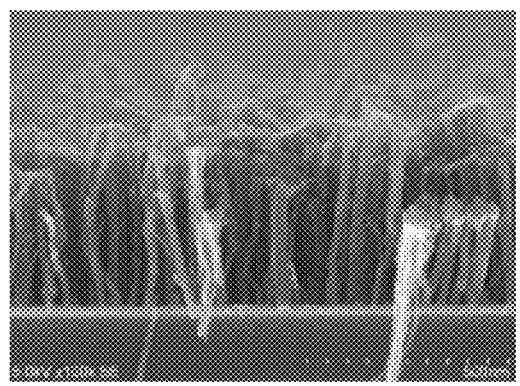
FIG. 12A is an SEM photograph of a cross-section of a substrate illustrating results of a carbon nanotube formation experiment (an activation treatment time of 3 minutes) in Example 4.
Figure 12B:
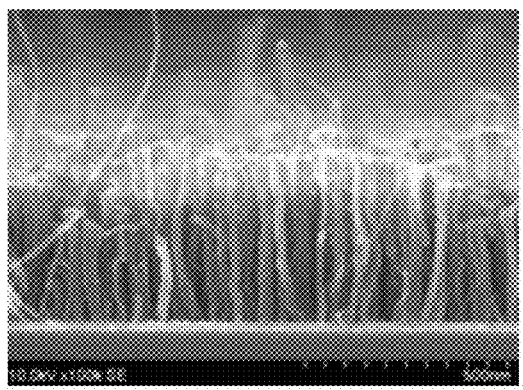
FIG. 12B is an SEM photograph of a cross-section of a substrate illustrating results of a carbon nanotube formation experiment (an activation treatment time of 5 minutes) in Example 4.
Figure 12C:
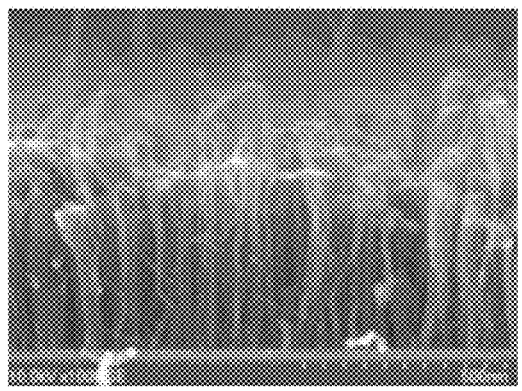
FIG. 12C is an SEM photograph of a cross-section of a substrate illustrating results of a carbon nanotube formation experiment (an activation treatment time of 10 minutes) in Example 4.
Figure 12D:
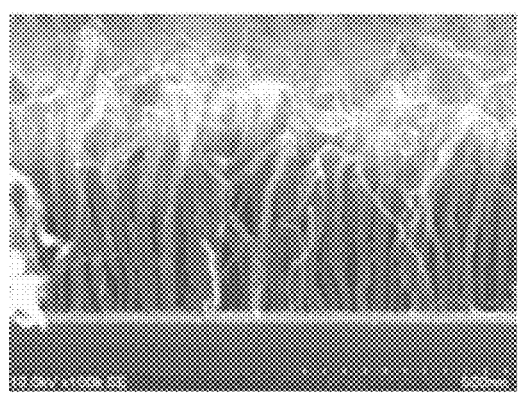
FIG. 12D is an SEM photograph of a cross-section of a substrate illustrating results of a carbon nanotube formation experiment (an activation treatment time of 15 minutes) in Example 4.

The carbon nanotube was formed in the same manner as in Example 1 except that the microwave power in the activation treatment was changed to 0.5 kW and the treatment time was changed to 3 minutes, 5 minutes, 10 minutes or 15 minutes. The carbon nanotubes grown under each condition were imaged by an SEM. The result of the treatment time of 3 minutes is illustrated in FIG. 12A, the result of the treatment time of 5 minutes is illustrated in FIG. 12B, the result of the treatment time of 10 minutes is illustrated in FIG. 12C, and the result of the treatment time of 15 minutes is illustrated in FIG. 12D. From the comparison of FIGS. 12A to 12D, although the high-density carbon nanotube was formed in every activation treatment condition (treatment time), it was found that, within the treatment time range of 3 to 15 minutes, the carbon nanotubes were grown to be the longest in the case of 15 minutes (FIG. 12D) which is the longest treatment time. The reason is supposed that, nitridation of the TiN layer in the activation treatment progressed sufficiently and thus TiN was sufficiently activated as the co-catalyst. However, since the high-density carbon nanotube was formed even in the case of 3 minutes (FIG. 12A) which is the shortest treatment time, it is considered that the activation treatment time of 3 minutes or more is sufficient from the viewpoint of the throughput.

Comparative Example 2

The wafer W having the same structure as in Example 1 was loaded into a treatment container of a treatment apparatus having the same configuration as the treatment apparatus 100 of FIG. 1, the atomization treatment was not performed, and an attempt was made to grow the carbon nanotube using the thermal CVD method after performing the activation treatment under the following conditions. The activation treatment and the carbon nanotube formation were performed consecutively at the same temperature.

Figure 13:
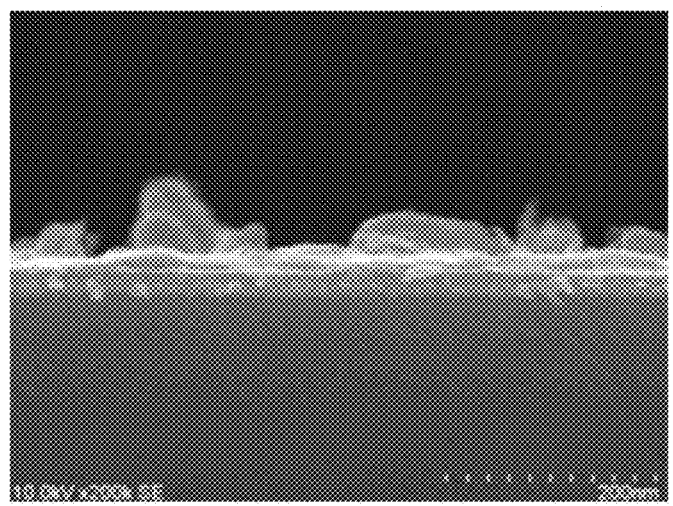
FIG. 13 is an SEM photograph of a surface of a substrate illustrating results of a carbon nanotube formation experiment in Comparative Example 2.

<Activation Treatment Conditions>
Treatment pressure: 133 Pa (1 Torr)
Treatment gas:
$NH_3$ gas 200 mL/min (sccm)
Ar gas 450 mL/min (sccm)
Microwave power: 1 kW
Treatment temperature: 470 degrees C.
Treatment time: 10 minutes <Carbon Nanotube Formation Conditions>
Treatment pressure: 400 Pa (3 Torr)
Treatment gas:
$C_2H_4$ gas 30 mL/min (sccm)
$N_2$ gas 200 mL/min (sccm)
Ar gas 450 mL/min (sccm)
Treatment temperature: 470 degrees C.
Treatment time: 60 minutes FIG. 13 illustrates an SEM image of the carbon nanotube grown in this manner. As illustrated in FIG. 13, although the stubby carbon nanotube like a lump of graphite was observed, a carbon nanotube having a specific orientation was not formed.

Comparative Example 3

The wafer W having the same structure as in Example 1 was carried into a treatment container of a treatment apparatus having the same configuration as the treatment apparatus 100 of FIG. 1, and an attempt was made to grow the carbon nanotube by the thermal CVD method after performing the atomization treatment and the activation treatment under the following conditions. By accommodating the wafer W in a load-lock chamber under the standby state between the atomization treatment and the activation treatment, the temperature change was performed in a stepwise manner where a temperature change from the temperature $T_1$ in the atomization treatment to the temperature $T_2$ in the activation treatment includes a heating procedure of 240 degrees C./min or more. The activation treatment and the carbon nanotube formation were performed consecutively at the same temperature.

<Atomization Treatment Conditions>
Treatment pressure: 266 Pa (2 Torr)
Treatment gas:
Ar gas 100 mL/min (sccm)
Microwave power: 2.0 kW
Treatment temperature: 350 degrees C.
Treatment time: 10 minutes <Standby Conditions in Load-Lock Chamber>
Standby time: approximately 30 minutes
Standby temperature: 100 degrees C. (stable state)

Figure 14:
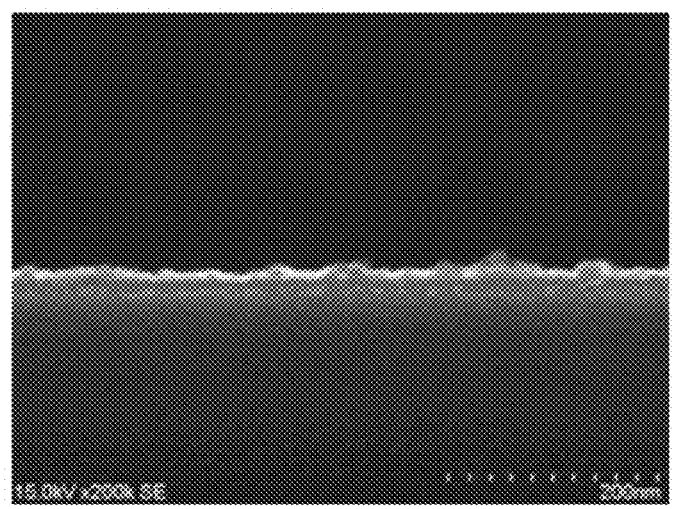
FIG. 14 is an SEM photograph of a surface of a substrate illustrating results of a carbon nanotube formation experiment in Comparative Example 3.

<Activation Treatment Conditions>
Treatment pressure: 133 Pa (1 Torr)
Treatment gas:
$NH_3$ gas 100 mL/min (sccm)
Ar gas 450 mL/min (sccm)
Microwave power: 0.5 kW
Treatment temperature: 470 degrees C.
Treatment time: 10 minutes <Carbon Nanotube Formation Conditions>
  Treatment pressure: 400 Pa (3 Torr)
  Treatment gas:
    $C_2H_4$ gas 30 mL/min (sccm)
    $N_2$ gas 200 mL/min (sccm)
    Ar gas 450 mL/min (sccm)
  Treatment temperature: 470 degrees C.
  Treatment time: 60 minutes FIG. 14 illustrates an SEM image of the carbon nanotube grown in this manner. As illustrated in FIG. 14, although the carbon particle such as a lump of graphite was observed, a carbon nanotube having a specific orientation was not formed in Comparative Example 3 which uses ammonia gas in the activation treatment.

Comparative Example 4

Figure 15:
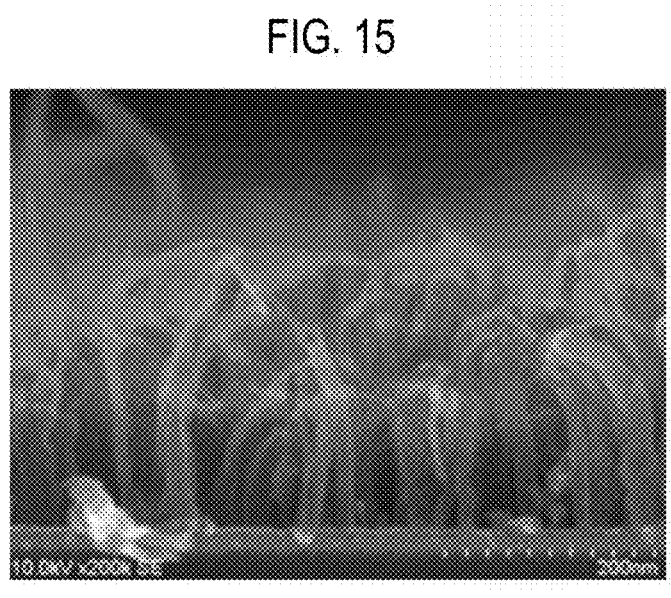
FIG. 15 is an SEM photograph of a surface of a substrate illustrating results of a carbon nanotube formation experiment in Comparative Example 4.

In Comparative Example 3, an attempt was made to form the carbon nanotube under the same conditions as in Comparative Example 3 except that, an $O_2$ gas of 100 mL/min (sccm) was added in the atomization treatment, the atomization treatment time and the activation treatment time were both changed to 5 minutes, and an $H_2$ gas of 200 mL/min (sccm) was used in place of the $N_2$ gas 200 mL/min (sccm) during the thermal CVD process. The result is illustrated in FIG. 15. As illustrated in FIG. 15, it was found that the density of the carbon nanotube is low and the length of the carbon nanotube is short in comparison with Example 1 (FIG. 8). The reason is considered that the reduction of the TiN layer and the activation of the Co catalyst particles were insufficient in $NH_3$ used in the activation treatment.

Comparative Example 5

Figure 16:
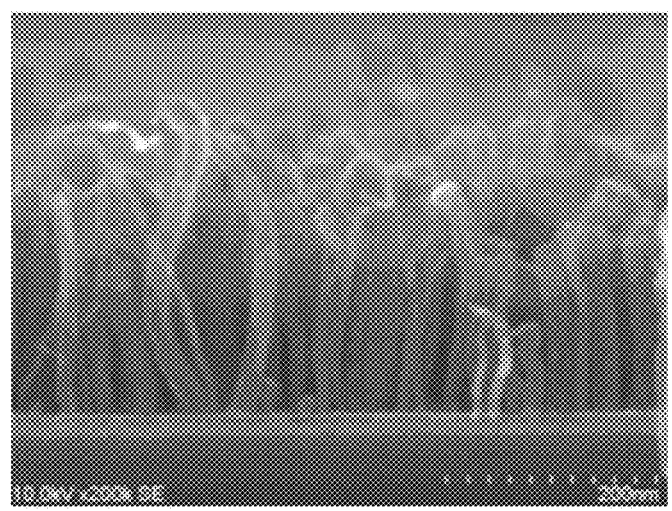
FIG. 16 is an SEM photograph of a surface of a substrate illustrating results of a carbon nanotube formation experiment in Comparative Example 5.

In Comparative Example 3, an attempt was made to form the carbon nanotube under the same conditions as in Comparative Example 3 except that, the atomization treatment time and the activation treatment time were both changed to 5 minutes, and an $H_2$ gas of 200 mL/min (sccm) was used in place of the $N_2$ gas of 200 mL/min (sccm) during the thermal CVD process. The result is illustrated in FIG. 16. As illustrated in FIG. 16, it was found that the density of the carbon nanotube was low and the length of the carbon nanotube was short in comparison to Example 1 (FIG. 8). The reason is considered that the reduction of the TiN layer and the activation of the Co catalyst particles are insufficient in $NH_3$ used in the activation treatment.

Example 5

<Carbon Nanotube Formation Using Plasma CVD Method (1)>

The wafer W having the same structure as in Example 1, except that the wafer W has a Ni layer of 2 nm as the catalytic metal layer, was loaded into a treatment container of a treatment apparatus having the same configuration as the treatment apparatus 100 of FIG. 1, and the carbon nanotube was grown by the plasma CVD method after the atomization treatment and the activation treatment were performed under the following conditions. By accommodating the wafer W in a load-lock chamber under the standby state between the atomization treatment and the activation treatment, the temperature change was performed in a stepwise manner where a temperature change from the temperature $T_1$ in the atomization treatment to the temperature $T_2$ in the activation treatment includes a heating procedure of 240 degrees C./min or more. The activation treatment and the carbon nanotube formation were performed consecutively at the same temperature.

Figure 17A:
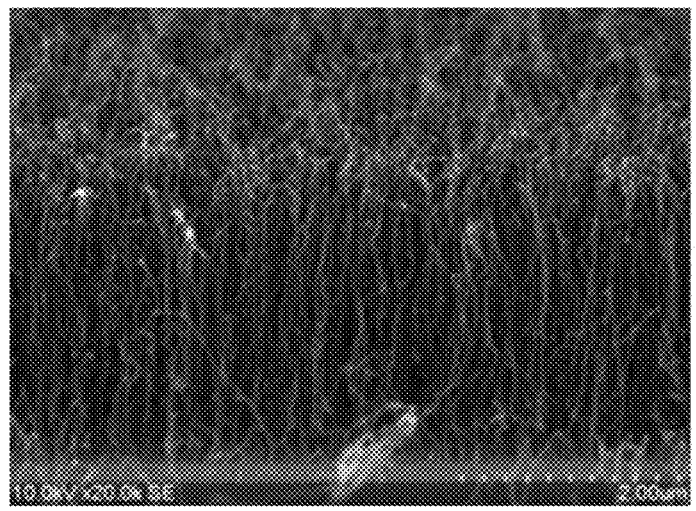
FIG. 17A is an SEM photograph of a surface of a substrate illustrating results of a carbon nanotube formation experiment in Example 5.
Figure 17B:
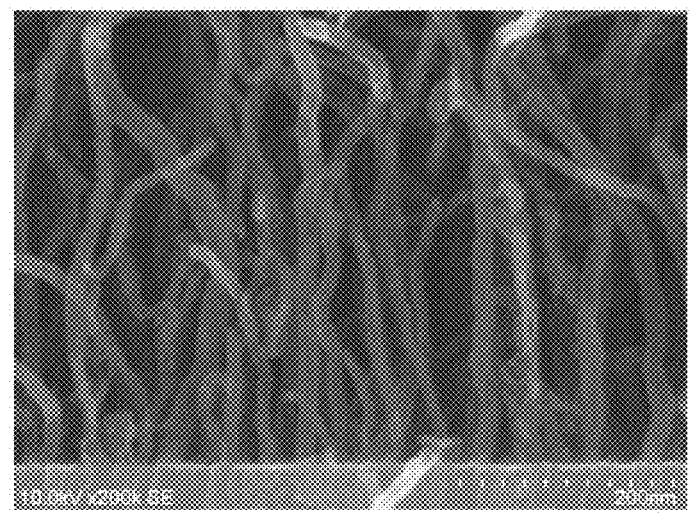
FIG. 17B is an enlarged SEM photograph illustrating main parts of FIG. 17A.

<Atomization Treatment Conditions>
  Treatment pressure: 266 Pa (2 Torr)
  Treatment gas:
    Ar gas 100 mL/min (sccm)
  Microwave power: 2.0 kW
  Treatment temperature: 350 degrees C.
  Treatment time: 5 minutes
<Standby Conditions in Load-Lock Chamber>
  Standby time: approximately 30 minutes
  Standby temperature: 100 degrees C. (stable state)<
<Activation Treatment Conditions>
  Treatment pressure: 133 Pa (1 Torr)
  Treatment gas:
    $H_2$ gas 462 mL/min (sccm)
    $N_2$ gas 100 mL/min (sccm)
    Ar gas 450 mL/min (sccm)
  Microwave power: 0.5 kW
  Treatment temperature: 470 degrees C.
  Treatment time: 5 minutes
<Carbon Nanotube formation Conditions>
  Treatment pressure: 400 Pa (3 Torr)
  Treatment gas:
    $C_2H_4$ gas 6.3 mL/min (sccm)
    $H_2$ gas 370 mL/min (sccm)
    Ar gas 450 mL/min (sccm)
  Microwave power: 0.5 kW
  Treatment temperature: 470 degrees C.
  Treatment time: 30 minutes FIGS. 17A and 17B illustrate SEM images of the carbon nanotube grown in this manner. FIG. 17B is a partially enlarged view of FIG. 17A. As illustrated in FIGS. 17A and 17B, it was confirmed that the carbon nanotube was oriented in a substantially perpendicular state and had excellent high density. It is considered that such result is due to the high activation ratio of the catalyst.

Comparative Example 6

The wafer W having the same structure as in Example 1 was loaded into a treatment container of a treatment apparatus having the same configuration as the treatment apparatus 100 of FIG. 1, and, without performing the atomization treatment, an attempt was made to grow the carbon nanotube by the plasma CVD method after the activation treatment was performed under the following conditions. In addition, a purge treatment was performed using a $N_2$ gas between the activation treatment and the carbon nanotube formation.

<Activation Treatment Conditions>
  Treatment pressure: 66.7 Pa (0.5 Torr)
  Treatment gas:
    $H_2$ gas 462 mL/min (sccm)
    Ar gas 450 mL/min (sccm)
  Microwave power: 1 kW
  Treatment temperature: 470 degrees C.
  Treatment time: 5 minutes
<Purge Treatment Conditions>
  Treatment pressure: 400 Pa (3 Torr)
  Treatment gas:
    $N_2$ gas 200 mL/min (sccm)
    Ar gas 450 mL/min (sccm)
  Treatment temperature: 470 degrees C.
  Treatment time: 2 minutes <Carbon Nanotube Formation Conditions>

Treatment pressure: 400 Pa (3 Torr)

Treatment gas:

$C_2H_4$ gas 6.3 mL/min (sccm)

$H_2$ gas 370 mL/min (sccm)

Ar gas 450 mL/min (sccm)

Microwave power: 0.5 kW

Treatment temperature: 470 degrees C.

Treatment time: 30 minutes

Figure 18A:
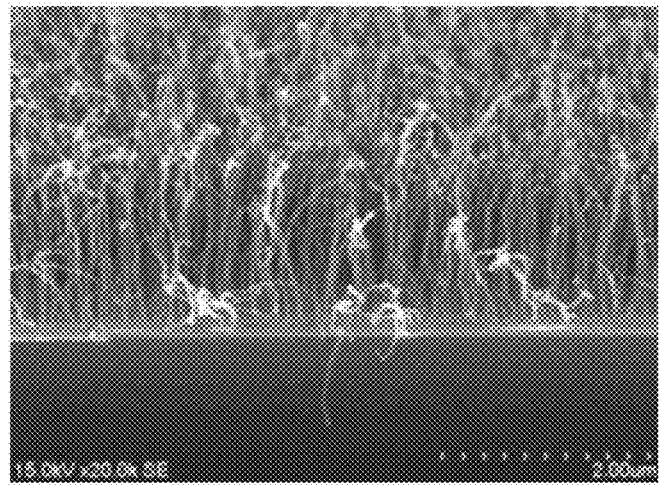
FIG. 18A is an SEM photograph of a surface of a substrate illustrating results of a carbon nanotube formation experiment in Comparative Example 6.
Figure 18B:
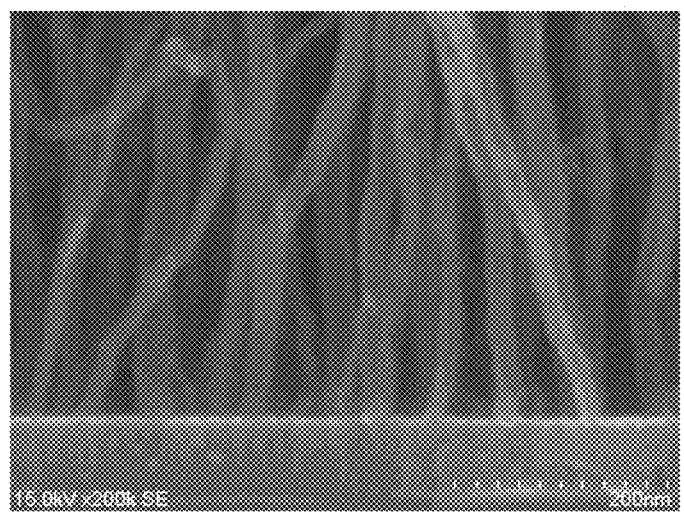
FIG. 18B is an enlarged SEM photograph illustrating main parts of FIG. 18A.

FIGS. 18A and 18B illustrate SEM images of the carbon nanotube grown in this manner. FIG. 18B is a partially enlarged view of FIG. 18A. As illustrated in FIGS. 18A and 18B, although the formation of carbon nanotube was observed, the orientation, the density and the length of the carbon nanotube were inferior to those in Example 5 (FIGS. 17A and 17B) described above.

Reference Example

<Consideration of Catalytic Metal Species (Plasma CVD Method)>

Figure 19A:
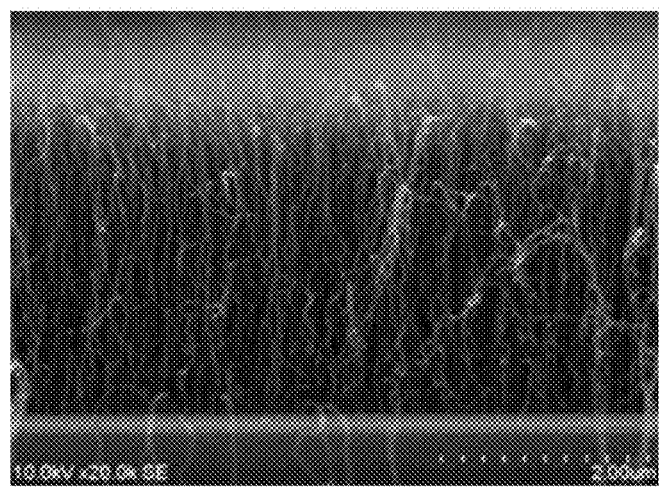
FIG. 19A is an SEM photograph of a surface of a substrate illustrating results of a carbon nanotube formation experiment (a Ni layer of 2 nm) in a Reference Example.
Figure 19B:
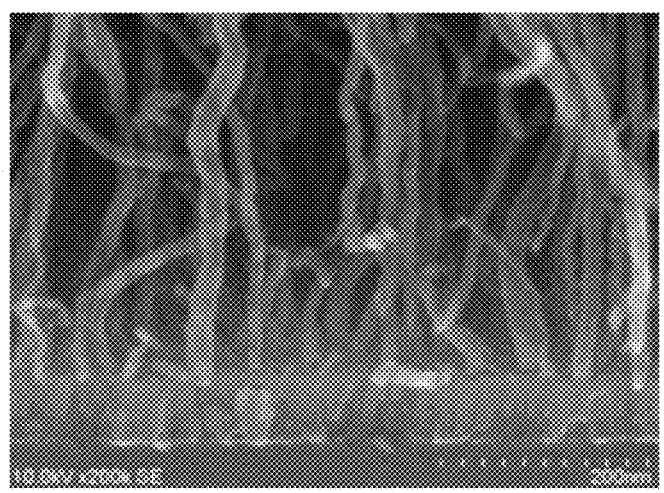
FIG. 19B is an enlarged SEM photograph illustrating main parts of FIG. 19A.
Figure 20A:
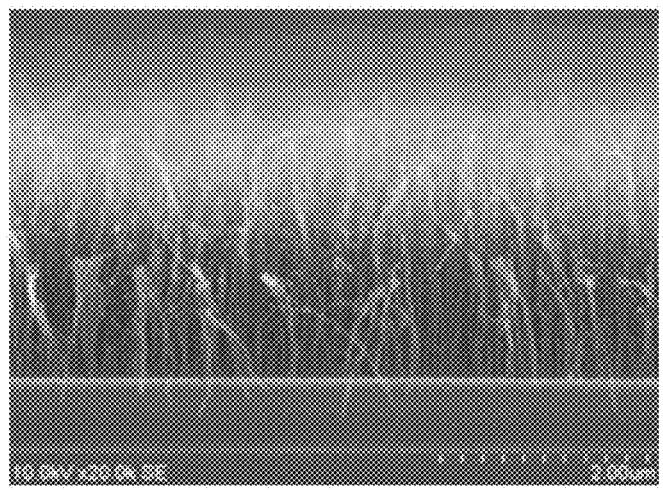
FIG. 20A is an SEM photograph of a surface of a substrate illustrating results of a carbon nanotube formation experiment (a Co layer of 2.3 nm) in a Reference Example.
Figure 20B:
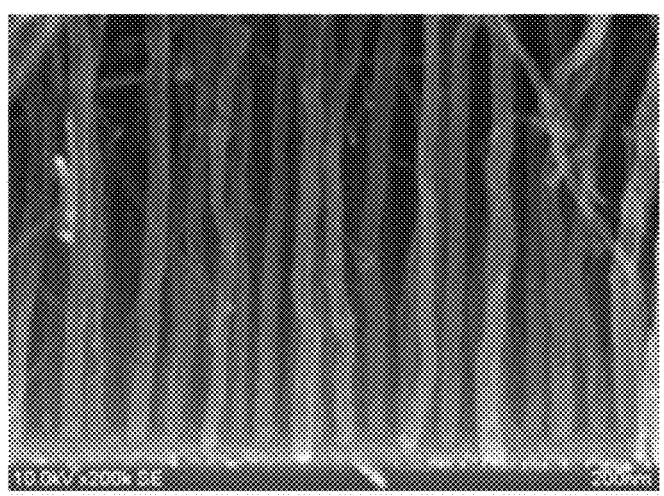
FIG. 20B is an enlarged SEM photograph illustrating main parts of FIG. 20A.

The wafer W having the same structure as in Example 1, except that the wafer W has a Ni layer of 2 nm or a Co layer of 2.3 nm as the catalytic metal layer, was used. The carbon nanotube was grown by the plasma CVD method by treating the wafer W under the same conditions as in Example 5. FIGS. 19A, 19B, 20A, and 20B illustrate SEM images of the carbon nanotube grown in this manner. FIG. 19A illustrates the result when using the Ni layer of 2 nm as the catalytic metal layer, and FIG. 19B is a partially enlarged view of FIG. 19A. FIG. 20A illustrates the result when using the Co layer of 2.3 nm as the catalytic metal layer, and FIG. 20B is a partially enlarged view of FIG. 20A. From the comparison of FIGS. 19A, 19B, 20A, and 20B, it was found that the carbon nanotube was grown to be longer in the case of using the Ni layer of 2 nm as the catalytic metal layer than in the case of using the Co layer of 2.3 nm as the catalytic metal layer. However, from the comparison of FIGS. 19B and 20B, it was found that the vertical orientation and the density of the carbon nanotube were higher in the case of using the Co layer of 2.3 nm as the catalytic metal layer than in the case of using a Ni layer of 2 nm as the catalytic metal layer.

From the above described experimental results, it was confirmed that the carbon nanotube having high density and oriented substantially perpendicularly can be formed using either the thermal CVD method or the plasma CVD method, by performing the atomization treatment using the treatment apparatus 100 capable of generating the microwave plasma and by performing the activation treatment using the plasma of the gas mixture of $H_2$ gas and $N_2$ gas.

As described above, according to the pretreatment method of the present embodiment, the activation ratio of the catalyst can be increased by including the process of activating the catalytic metal fine particles using the plasma of the gas mixture of the hydrogen-containing gas and the nitrogen gas. Moreover, according to the carbon nanotube formation method of the present embodiment that includes the aforementioned pretreatment method, the high-density carbon nanotube can be formed on the surface of the substrate as a treatment target.

Although the embodiments of the present invention have been described in detail for illustrative purposes, various modifications can be made to the invention without being limited to the above embodiments. For example, although the examples of performing the atomization treatment and the activation treatment by the plasma treatment apparatus of RLSA microwave plasma type have been described in the above embodiments, it is also possible to use other microwave plasma types. Further, without being limited to the microwave plasma, other types of plasma, for example, an inductively coupled plasma and a capacitively coupled plasma, may be used.

This international application claims priority based on Japanese Patent Application No. 2011-167246 filed on Jul. 29, 2011, the entire contents of which are incorporated herein.

What is claimed is:

1. A pretreatment method performed prior to a carbon nanotube growth using a CVD method on catalytic metal fine particles formed on a treatment target, the pretreatment method consisting of:

preparing the treatment target having a catalytic metal layer formed on a surface of the treatment target;

performing a first plasma treatment for forming the catalytic metal fine particles by applying a plasma to the catalytic metal layer to atomize a catalytic metal;

allowing Ar gas to flow into a treatment container right after the first plasma treatment and then converting the Ar gas into an Ar plasma; and right after converting the Ar gas, performing a second plasma treatment for activating the catalytic metal fine particles by applying a plasma of a gas mixture containing a hydrogen-containing gas and a nitrogen gas to the catalytic metal fine particles, wherein the hydrogen-containing gas and the nitrogen gas are converted into a plasma by the Ar plasma, wherein the treatment target includes a co-catalytic layer formed of a nitride below the catalytic metal layer, and wherein, in the act of performing the second plasma treatment, the co-catalytic layer is nitrided by the plasma of the gas mixture containing the hydrogen-containing gas and the nitrogen gas.

2. The pretreatment method of claim 1, wherein the co-catalytic layer is formed of a nitride selected from a group consisting of TiN, TaN, SiN, and AlN.

3. The pretreatment method of claim 1, wherein a treatment temperature of the first plasma treatment is $T_1$ and a treatment temperature of the second plasma treatment is $T_2$, the temperature $T_2$ being higher than the temperature $T_1$.

4. The pretreatment method of claim 3, wherein the temperature $T_1$ is in a range of 100 degrees C. or more and 450 degrees C. or less, and the temperature $T_2$ is in a range of 100 degrees C. or more and 550 degrees C. or less.

5. The pretreatment method of claim 4, wherein a temperature difference $(T_2-T_1)$ between the temperature $T_2$ and the temperature $T_1$ is 50 degrees C. or more.

6. The pretreatment method of claim 3, wherein a heating section having a heating rate of at least 100 degrees C./min or more is included in the course of a temperature change from the temperature $T_1$ to the temperature $T_2$.

7. The pretreatment method of claim 3, wherein the treatment target is transferred from a stage to another location between the first and second plasma treatments while the stage is heated to the temperature T2.

8. A carbon nanotube formation method, consisting of:

preparing a treatment target having a catalytic metal layer formed on a surface of the treatment target;

performing a first plasma treatment for forming catalytic metal fine particles by applying a plasma to the catalytic metal layer to atomize a catalytic metal;

allowing Ar gas to flow into a treatment container right after the first plasma treatment and then converting the Ar gas into an Ar plasma; and right after converting the Ar gas, performing a second plasma treatment for activating the catalytic metal fine particles by applying a plasma of a gas mixture containing a hydrogen-containing gas and a nitrogen gas to the catalytic metal fine particles; and growing a carbon nanotube on the activated catalytic metal fine particles using a CVD method, wherein the hydrogen-containing gas and the nitrogen gas are converted into a plasma by the Ar plasma, wherein the treatment target includes a co-catalytic layer formed of a nitride below the catalytic metal layer, and wherein, in the act of performing the second plasma treatment, the co-catalytic layer is nitrided by the plasma of the gas mixture containing the hydrogen-containing gas and the nitrogen gas.

9. The carbon nanotube formation method of claim 8, wherein the second plasma treatment and growing a carbon nanotube are performed consecutively in the same treatment chamber.

10. The carbon nanotube formation method of claim 8, wherein growing a carbon nanotube is performed using a thermal CVD method.

11. The carbon nanotube formation method of claim 10, wherein a treatment temperature of the thermal CVD method is in a range of 300 degrees C. or more and 550 degrees C. or less.

12. The carbon nanotube formation method of claim 8, wherein growing a carbon nanotube is performed using a plasma CVD method.

13. The carbon nanotube formation method of claim 12, wherein a treatment temperature of the plasma CVD method is in a range of 100 degrees C. or more and 550 degrees C. or less.

14. The carbon nanotube formation method of claim 12, wherein the plasma CVD method uses an oxidizing gas as a plasma generation gas.

15. The carbon nanotube formation method of claim 8, wherein the co-catalytic layer is formed of a nitride selected from a group consisting of TiN, TaN, SiN, and AlN.

16. The carbon nanotube formation method of claim 8, wherein a treatment temperature of the first plasma treatment is $T_1$, and a treatment temperature of the second plasma treatment is $T_2$, the temperature $T_2$ being higher than the temperature $T_1$.

17. The carbon nanotube formation method of claim 16, wherein the temperature $T_1$ is in a range of 100 degrees C. or more and 450 degrees C. or less, and the temperature $T_2$ is in a range of 100 degrees C. or more and 550 degrees C. or less.

18. The carbon nanotube formation method of claim 17, wherein a temperature difference ($T_2-T_1$) between the temperature $T_2$ and the temperature $T_1$ is 50 degrees C. or more.

19. The carbon nanotube formation method of claim 16, wherein a heating section having a heating rate of at least 100 degrees C./min or more is included in the course of a temperature change from the temperature $T_1$ to the temperature $T_2$.

20. A pretreatment method performed prior to a carbon nanotube growth using a CVD method on catalytic metal fine particles formed on a treatment target, the pretreatment method consisting of:

preparing the treatment target having a catalytic metal layer formed on a surface of the treatment target;

performing a first plasma treatment for forming the catalytic metal fine particles by applying a plasma of an oxygen-containing gas to the catalytic metal layer to atomize a catalytic metal;

allowing Ar gas to flow into a treatment container right after the first plasma treatment and then converting the Ar gas into an Ar plasma; and right after converting the Ar gas, performing a second plasma treatment for activating the catalytic metal fine particles by applying a plasma of a gas mixture containing a hydrogen-containing gas and a nitrogen gas to the catalytic metal fine particles, wherein the hydrogen-containing gas and the nitrogen gas are converted into a plasma by the Ar plasma, wherein the treatment target includes a co-catalytic layer formed of a nitride below the catalytic metal layer, and wherein, in the act of performing the second plasma treatment, the co-catalytic layer is nitrided by the plasma of the gas mixture containing the hydrogen-containing gas and the nitrogen gas.

21. The method of claim 20, wherein the oxygen-containing gas includes any of $O_2$, $H_2O$, $O_3$, and $N_2O$.

22. A pretreatment method performed prior to a carbon nanotube growth using a CVD method on catalytic metal fine particles formed on a treatment target, the pretreatment method consisting of:

preparing the treatment target having a catalytic metal layer formed on a surface of the treatment target;

performing a first plasma treatment for forming the catalytic metal fine particles by applying a plasma to the catalytic metal layer to atomize a catalytic metal and for oxidizing the surfaces of the catalyst metal fine particles;

allowing Ar gas to flow into a treatment container right after the first plasma treatment and then converting the Ar gas into an Ar plasma; and right after converting the Ar gas, performing a second plasma treatment for activating the catalytic metal fine particles by applying a plasma of a gas mixture containing a hydrogen-containing gas and a nitrogen gas to the catalytic metal fine particles, wherein the hydrogen-containing gas and the nitrogen gas are converted into a plasma by the Ar plasma, wherein the treatment target includes a co-catalytic layer formed of a nitride below the catalytic metal layer, and wherein, in the act of performing the second plasma treatment, the co-catalytic layer is nitrided by the plasma of the gas mixture containing the hydrogen-containing gas and the nitrogen gas.

23. The method of claim 22, wherein oxidizing the surfaces of the catalyst metal fine particles is performed by an oxygen-containing gas that includes any of $O_2$, $H_2O$, $O_3$, and $N_2O$.

* * * * *